United States Patent
Claes et al.

(10) Patent No.: US 8,197,584 B2
(45) Date of Patent: Jun. 12, 2012

(54) METHODS FOR PREPARING CURABLE PIGMENT INKJET INK SETS

(75) Inventors: Roland Claes, Dendermonde (BE); Geert Deroover, Lier (BE)

(73) Assignee: Agfa Graphics NV, Mortsel (BE)

( * ) Notice: Subject to any disclaimer, the term of this patent is extended or adjusted under 35 U.S.C. 154(b) by 527 days.

(21) Appl. No.: 12/441,908

(22) PCT Filed: Oct. 2, 2007

(86) PCT No.: PCT/EP2007/060470
§ 371 (c)(1),
(2), (4) Date: Mar. 19, 2009

(87) PCT Pub. No.: WO2008/043692
PCT Pub. Date: Apr. 17, 2008

(65) Prior Publication Data
US 2010/0018438 A1    Jan. 28, 2010

Related U.S. Application Data

(60) Provisional application No. 60/829,578, filed on Oct. 16, 2006.

(30) Foreign Application Priority Data

Oct. 11, 2006 (EP) .................................. 06122098

(51) Int. Cl.
*C09D 11/02* (2006.01)

(52) U.S. Cl. .............................................. 106/31.6
(58) Field of Classification Search ............ 106/31.6
See application file for complete search history.

(56) References Cited

U.S. PATENT DOCUMENTS

| | | |
|---|---|---|
| 2002/0096085 A1 | 7/2002 | Gotoh et al. |
| 2003/0035034 A1* | 2/2003 | Fukumoto et al. ............. 347/86 |
| 2006/0170745 A1 | 8/2006 | Deroover et al. |
| 2007/0037901 A1* | 2/2007 | Kanaya et al. ................ 523/160 |
| 2008/0022887 A1* | 1/2008 | Tanoue et al. ................ 106/31.2 |

FOREIGN PATENT DOCUMENTS

| | | |
|---|---|---|
| EP | 1 674 538 A1 | 6/2006 |
| GB | 2 367 299 A | 4/2002 |
| JP | 2005-41906 A | 2/2005 |
| WO | WO 2006088158 A1 * | 8/2006 |

OTHER PUBLICATIONS

Official Communication issued in International Patent Application No. PCT/EP2007/060470, mailed on Dec. 6, 2007.

* cited by examiner

*Primary Examiner* — Jerry Lorengo
*Assistant Examiner* — Veronica F Faison
(74) *Attorney, Agent, or Firm* — Keating & Bennett, LLP

(57) ABSTRACT

A curable pigment inkjet ink set includes a cyan inkjet ink, a yellow inkjet ink, and a magenta inkjet ink, wherein the yellow inkjet ink having $ABS(Y)_{momo} <5$ and $ABS(Y)_{400-500} >60$ includes one or more yellow pigments; the cyan inkjet ink includes one or more β-copper phthalocyanine pigments; and the magenta inkjet ink contains a mixed crystal including a first quinachdone and a second quinacridone in a ratio of the first quinacridone over the second quinacridone such that $ABS(M)_{500-530} >20$ and $ABS(M)_{500-600} >60$. $ABS(Y)_{500-530}$ represents the absorbance of the yellow inkjet ink between 500 and 530 nm; $ABS(M)_{500-530}$ represents the absorbance of the magenta inkjet ink between 500 and 530 nm; $ABS(Y)_{400-500}$ represents the absorbance ot the yellow inkjet ink between 400 and 500 nm; and $ABS(M)_{500-600}$ represents the absorbance of the magenta inkjet ink between 500 and 600 nm.

12 Claims, No Drawings

METHODS FOR PREPARING CURABLE PIGMENT INKJET INK SETS

CROSS-REFERENCE TO RELATED APPLICATIONS

This application is a 371 National Stage Application of PCT/EP2007/060470, filed Oct. 2, 2007. This application claims the benefit of U.S. Provisional Application No. 60/829,578, filed Oct. 16, 2006, which is incorporated by reference herein in its entirety. In addition, this application claims the benefit of European Application No. 06122098.4, filed Oct. 11, 2006, which is also incorporated by reference herein in its entirety.

BACKGROUND OF THE INVENTION

1. Field of the Invention

The present invention relates to methods for preparing curable pigment inkjet ink sets and curable pigment inkjet ink sets having improved properties of colour gamut, dispersion quality and stability.

2. Description of the Related Art

In inkjet printing tiny drops of ink fluid are projected directly onto an ink-receiver surface without physical contact between the printing device and the ink-receiver. The printing device stores the printing data electronically and controls a mechanism for ejecting the ink drops image-wise onto the ink-receiver.

Inkjet ink compositions typically include following ingredients: dyes or pigments, water and/or organic solvents, humectants such as glycols, detergents, thickeners, polymeric binders, preservatives, etc. It will be readily understood that the optimal composition of such ink is dependent on the inkjet printing method used and on the nature of the ink-receiver to be printed. The ink compositions can be roughly divided in:
- water-based, the drying mechanism involving absorption, penetration and evaporation;
- oil-based, the drying involving absorption and penetration;
- solvent-based, the drying primarily involving evaporation;
- hot melt or phase change, in which the ink is liquid at the ejection temperature but solid at room temperature and wherein drying is replaced by solidification;
- UV-curable, in which drying is replaced by polymerization.

Water-based inks suffer from a number of disadvantages such as:
(a) their requiring water evaporation and therefore an extensive drying system, especially when printing speed is important;
(b) the tendency of large printed areas to cockle;
(c) sensitivity of images to wet and dry rubbing; and
(d) the tendency of low viscosity inks to dry at the tip of the orifice.

The use of polar solvent-based inks can overcome some of the problems inherent in water-based inks, but results in other problems such as the possible generation of toxic or inflammable vapours. Therefore efforts were made to develop low-solvent ink compositions from which the concept of radiation curable ink compositions emerged.

Radiation curable pigment inkjet inks comprise one or more colorants, polymerizable compounds and one or more photo-initiators. The photo-initiator absorbs radiation thereby generating a radical (radical polymerization) or an acid (cationic polymerization) which initiates the polymerization reaction of the polymerizable compounds.

The colorants in curable pigment inkjet inks are usually colour pigments because they exhibit better light and ozon stability compared to dyes. Preparation of thermally stable dispersions of submicron colour pigment particles is more difficult for curable pigment inkjet inks, especially when the colour pigments have a non-polar surface.

Often curable inkjet ink sets are now commercialized, wherein the different inks are not sufficiently matched with each other. For example, the combined absorption of all inks does not give a complete absorption over the whole visible spectrum, e.g. "gaps" exist between the absorption spectra of the colorants. Another problem is that an ink might be absorbing in the range of another ink. The resulting colour gamut of these inkjet ink sets is low or mediocre.

Generally radiation curable pigment inkjet ink sets exhibit a mediocre colour gamut compared to aqueous pigment and dye based inkjet ink sets. The colour gamut represents the number of different colours that can be produced by an ink set. Several methods for improving colour gamut are known in aqueous inkjet jets but have disadvantages when used in radiation curable pigment inkjet inks. For example the combination of pigments with dyes or milling pigments to smaller particle size improve the colour gamut at the expense of light stability. In aqueous inks this is at least in part compensated by adding UV-absorbing compounds to the ink. But, including UV-absorbers in radiation curable pigment inkjet inks result in lower curing speeds since the photo-initiators usually absorb UV-light.

The colour gamut of ink sets can also be improved by selecting, matching and mixing different colour pigments. However, this is a time-consuming method, not only by the numerous combinations that can be made, but also by the above mentioned problems for the preparation of thermally stable radiation curable dispersions of submicron colour pigment particles. Furthermore, a change of pigment may require adaptation of the photo-initiator (system) due to large changes in the absorption of the pigment in the UV-region of the spectrum.

SUMMARY OF THE INVENTION

In order to overcome the problems described above, preferred embodiments of the present invention provide a method for preparing curable inkjet ink sets with improved colour gamut requiring only limited adaptations of the photo-initiator system, pigment stabilization or milling procedures.

Another preferred embodiment of the present invention provides a radiation curable pigment inkjet ink set exhibiting high colour gamut and dispersion stability.

These and other advantages and benefits of the preferred embodiments of the present invention will become apparent from the description hereinafter.

Excellent colour gamut was obtained by selecting C.I. Pigment Yellow 150 for the yellow inkjet ink and C.I. Pigment Blue 15:4 for the cyan inkjet ink and then providing a mixed crystal of C.I. Pigment Red 202 and C.I. Pigment Violet 19 comprising a major amount of C.I. Pigment Violet 19 for the magenta inkjet ink.

Advantages and benefits of a preferred embodiment of the present invention are realized with a curable pigment inkjet ink set as defined below.

Advantages and benefits of a preferred embodiment of the present invention are realized with a method for preparing a curable pigment inkjet ink set as defined below.

These and other elements, features, steps, characteristics and advantages of the present invention will become more apparent from the following detailed description of preferred embodiments thereof.

DETAILED DESCRIPTION OF THE PREFERRED EMBODIMENTS

Definitions

The term "mixed crystal", which is synonymous for "solid solution", as used in disclosing the present invention, means a solid, homogeneous mixture of two or more constituents, which may vary in composition between certain limits and remain homogeneous.

The term "colorant", as used in disclosing the present invention, means dyes and pigments.

The term "dye", as used in disclosing the present invention, means a colorant having a solubility of 10 mg/L or more in the medium in which it is applied and under the ambient conditions pertaining.

The term "pigment" is defined in DIN 55943, herein incorporated by reference, as a colouring agent that is practically insoluble in the application medium under the pertaining ambient conditions, hence having a solubility of less than 10 mg/L therein.

The term "C.I." is used in disclosing the present application as an abbreviation for Colour Index.

The term "actinic radiation" as used in disclosing the present invention, means electromagnetic radiation capable of initiating photochemical reactions.

The term "alkyl" means all variants possible for each number of carbon atoms in the alkyl group i.e. for three carbon atoms: n-propyl and isopropyl; for four carbon atoms: n-butyl, isobutyl and tertiary-butyl; for five carbon atoms: n-pentyl, 1,1-dimethyl-propyl, 2,2-dimethylpropyl and 2-methylbutyl etc.

Mixed Crystals of Quinacridone

Mixed crystals are also referred to as solid solutions. Under certain conditions different quinacridones mix with each other to form solid solutions, which are quite different from both physical mixtures of the compounds and from the compounds themselves. In a solid solution, the molecules of the components enter into the same crystal lattice, usually, but not always, that of one of the components. The x-ray diffraction pattern of the resulting crystalline solid is characteristic of that solid and can be clearly differentiated from the pattern of a physical mixture of the same components in the same proportion. In such physical mixtures, the x-ray pattern of each of the components can be distinguished, and the disappearance of many of these lines is one of the criteria of the formation of solid solutions.

The mixed crystal suitable for the magenta inkjet ink in an inkjet ink set according to present invention comprises a first quinacridone and a second quinacridone. The first and second quinacridone should be present in the mixed crystal in a major amount, preferably their sum should make up at least 70 wt %, more preferably at least 80 wt % and most preferably 90 to 100 wt % of the total weight of the mixed crystal.

In a preferred embodiment the first quinacridone in the mixed crystal is an unsubstituted quinacridone (=C.I. Pigment Violet 19) and the second quinacridone is 2,9-dichloroquinacridone (=C.I. Pigment Red 202).

In another embodiment the first quinacridone in the mixed crystal is an unsubstituted quinacridone (=C.I. Pigment Violet 19) and the second quinacridone is C.I. Pigment Red 122.

In another embodiment the first quinacridone in the mixed crystal is an unsubstituted quinacridone (=C.I. Pigment Violet 19) and the second quinacridone is C.I. Pigment Red 192.

The amount of unsubstituted quinacridone in a mixed crystal can be easily determined by Probe-MS.

The mixed crystal of quinacridone may comprise further minor amounts of one or more other quinacridones. For example, a dimethyl substituted quinacridone, a monomethyl substituted quinacridone and/or quinacridone having only one chloro group may be present in the case that the first quinacridone in the mixed crystal is an unsubstituted quinacridone (=C.I. Pigment Violet 19) and the second quinacridone is 2,9-dichloroquinacridone (=C.I. Pigment Red 202).

Curable Pigment Inkjet Inks and Inkjet Ink Sets

A curable pigment inkjet ink set according to the present invention comprises at least one yellow curable pigment inkjet ink (Y), at least one cyan curable pigment inkjet ink (C) and at least one magenta curable pigment inkjet ink (M) and preferably also at least one black curable pigment inkjet ink (K). The curable CMYK inkjet ink set may also be extended with extra inks such as red, green, blue, and/or orange to further enlarge the colour gamut of the image. The CMYK ink set may also be extended by the combination of full density and light density inks of both colour inks and/or black inks to improve the image quality by lowered graininess.

In a preferred embodiment, the curable pigment inkjet ink set is a radiation curable pigment inkjet ink set, most preferably by a UV-curable pigment inkjet ink set.

The curable pigment inkjet inks comprise at least three components: (i) a pigment, (ii) a dispersant and (iii) polymerizable compounds. The dispersant is preferably a polymeric dispersant.

The curable pigment inkjet inks comprise as dispersion medium monomers, oligomers and/or prepolymers possessing different degrees of functionality. A mixture including combinations of mono-, di-, tri- and/or higher functionality monomers, oligomers or prepolymers may be used. A catalyst called an initiator for initiating the polymerization reaction may be included in the curable pigment inkjet ink. The initiator can be a thermal initiator, but is preferably a photoinitiator. A combination of initiators may be present in the ink. The photo-initiator requires less energy to activate than the monomers, oligomers and/or prepolymers to form the polymer. The photo-initiator suitable for use in the curable pigment dispersion may be a Norrish type I initiator, a Norrish type II initiator or a photo-acid generator.

The viscosity of the curable pigment inkjet ink is preferably lower than 30 mP·s, more preferably lower than 15 mP·s, and most preferably between 2 and 10 mP·s at a shear rate of 100 $s^{-1}$ and a jetting temperature between 25 and 70° C.

The curable pigment inkjet inks may further also contain at least one surfactant.

The curable pigment inkjet inks preferably do not contain an evaporable component, but sometimes, it can be advantageous to incorporate a small amount of an organic solvent in such inks to improve adhesion to the surface of the ink-receiver after UV-curing. In this case, the added solvent can be any amount in the range that does not cause problems of solvent resistance and VOC, and preferably 0.1-10.0 wt %, and particularly preferably 0.1-5.0 wt %, each based on the total weight of the curable pigment inkjet ink.

The curable pigment inkjet inks may contain a dispersion synergist; preferably at least the magenta inkjet ink contains a dispersion synergist.

In a curable pigment inkjet ink set with a yellow ink comprising C.I. Pigment yellow 150 and a cyan ink comprising a β-copper phthalocyanine pigment, the mixed crystal of the magenta inkjet ink contains preferably between 75 and 95%, more preferably between 75 and 90% and most preferably between 80 and 85% of unsubstituted quinacridone (C.I. Pigment Violet 19) as measured by Probe-MS.

Methods for Preparing a Curable Pigment Inkjet Ink Set

The method for preparing a curable pigment inkjet ink set having a cyan inkjet ink, a yellow inkjet ink and a magenta inkjet ink according to the present invention comprises the steps of:

a) preparing a yellow inkjet ink consisting of one or more yellow pigments having $ABS(Y)_{500-530}<5$, more preferably $ABS(Y)_{500-530}<4$, and $ABS(Y)_{400-500}>60$;

b) preparing a cyan inkjet ink consisting of one or more β-copper phthalocyanine pigments; and c) preparing a magenta inkjet ink with a mixed crystal comprising a first quinacridone and a second quinacridone wherein the ratio of the first quinacridone over the second quinacridone is selected to have $ABS(M)_{500-530}>20$ and $ABS(M)_{500-600}>60$ with $ABS(Y)_{500-530}$ representing the absorbance of the yellow inkjet ink between 500 and 530 nm in a normalized absorption spectrum of the yellow ink;

$ABS(M)_{500-530}$ representing the absorbance of the magenta inkjet ink between 500 and 530 nm in a normalized absorption spectrum of the magenta ink;

$ABS(Y)_{400-500}$ representing the absorbance of the yellow inkjet ink between 400 and 500 nm in a normalized absorption spectrum of the yellow ink; and $ABS(M)_{500-600}$ representing the absorbance of the magenta inkjet ink between 500 and 600 nm in a normalized absorption spectrum of the magenta ink.

The method preferably uses C.I. Pigment Violet 19 as a first quinacridone pigment. And preferably the method uses C.I. Pigment Red 202 as a second quinacridone pigment.

The method preferably uses a yellow inkjet ink comprising C.I. Pigment Yellow 150, more preferably C.I. Pigment Yellow 150 is the only pigment present in the inkjet ink. If other pigments are present preferably at least 60 wt %, more preferably at least 80 wt % and most preferably at least 90 wt % of the pigments is made up of C.I. Pigment Yellow 150.

Pigments

Pigment particles in inkjet ink should be sufficiently small to permit free flow of the ink through the inkjet-printing device, especially at the ejecting nozzles. It is also desirable to use small particles for maximum colour strength and to slow down sedimentation.

The numeric average pigment particle size is preferably between 0.050 and 1 μm, more preferably between 0.070 and 0.300 μm and particularly preferably between 0.080 and 0.200 μm. Most preferably, the numeric average pigment particle size is no larger than 0.150 μm.

The pigment is preferably used in the inkjet ink in an amount of 0.1 to 20 wt %, preferably 1 to 10 wt % based on the total weight of the curable pigment inkjet ink.

The cyan pigment is a β-copper phthalocyanine pigment, such as C.I. Pigment Blue 15:3 and C.I. Pigment Blue 15:4, most preferably the β-copper phthalocyanine pigment is C.I. Pigment Blue 15:4.

The yellow inkjet ink preferably comprises at least C.I. Pigment Yellow 150 as a yellow pigment. A combination of C.I. Pigment Yellow 150 with another yellow pigment, such as a yellow pigment selected from the group consisting of C.I. Pigment Yellow 120, C.I. Pigment Yellow 139, C.I. Pigment Yellow 180 can be made, but most preferably the yellow inkjet ink contains only C.I. Pigment Yellow 150.

For a curable black inkjet ink, suitable pigment materials include carbon blacks such as REGAL™ 400R, MOGUL™ L, ELFTEX™ 320 from Cabot Co., or Carbon Black FW18, SPECIAL BLACK™ 250, SPECIAL BLACK™ 350, SPECIAL BLACK™ 550, PRINTEX™ 25, PRINTEX™ 35, PRINTEX™ 55, PRINTEX™ 150T from DEGUSSA Co., and C.I. Pigment Black 7 and C.I. Pigment Black 11.

In UV-curable ink, carbon black generally exhibits a warm brownish black tone, which is often corrected to a neutral tone by overprinting with cyan and magenta ink.

In a preferred embodiment, the curable pigment inkjet ink comprises a curable black inkjet ink having a chroma C* not larger than 4.0. This ink, which can be addressed as a neutral black inkjet ink, is obtained by adding a smaller amount of at least one second non-black pigment having an absorption maximum between 500 and 800 nm. The second non-black pigment is preferably a copper phthalocyanine pigment, but can be a quinacridone pigment or a mixture of a copper phthalocyanine pigment and quinacridone pigment. Most preferably the copper phthalocyanine pigment and/or the quinacridone pigment are the same pigments as the pigments used in the cyan inkjet ink respectively the magenta inkjet ink. By using the same pigments, no extra absorption is created which could reduce the curing speed.

Dispersants

The dispersants used in the curable pigment inkjet inks are preferably polymeric dispersants. Typical polymeric dispersants are copolymers of two monomers but may contain three, four, five or even more monomers. The properties of polymeric dispersants depend on both the nature of the monomers and their distribution in the polymer. Copolymeric dispersants suitable in pigment dispersions according to the present invention may have the following polymer compositions:

statistically polymerized monomers (e.g. monomers A and B polymerized into ABBAABAB);

alternating polymerized monomers (e.g. monomers A and B polymerized into ABABABAB);

gradient (tapered) polymerized monomers (e.g. monomers A and B polymerized into AAABAABBABBB);

block copolymers (e.g. monomers A and B polymerized into AAAAABBBBBB) wherein the block length of each of the blocks (2, 3, 4, 5 or even more) is important for the dispersion capability of the polymeric dispersant;

graft copolymers (graft copolymers consist of a polymeric backbone with side chains attached to the backbone); and mixed forms of these polymers, e.g. blocky gradient copolymers.

Polymeric dispersants suitable in curable pigment inkjet inks may have different polymer architecture including linear, comb/branched, star, dendritic (including dendrimers and hyperbranched polymers). A general review on the architecture of polymers is given by ODIAN, George, Principles Of Polymerization, 4th edition, Wiley-Interscience, 2004, p. 1-18.

Comb/branched polymers have side branches of linked monomer molecules protruding from various central branch points along the main polymer chain (at least 3 branch points).

Star polymers are branched polymers in which three or more either similar or different linear homopolymers or copolymers are linked together to a single core.

Dendritic polymers comprise the classes of dendrimers and hyperbranched polymers. In dendrimers, with well-defined mono-disperse structures, all branch points are used (multi-step synthesis), while hyperbranched polymers have a plurality of branch points and multifunctional branches that lead to further branching with polymer growth (one-step polymerization process).

Polymeric dispersants inks may also be prepared via addition or condensation type polymerizations. Polymerization methods include those described by ODIAN, George, Principles of Polymerization, 4th edition, Wiley-Interscience, 2004, p. 39-606.

Addition polymerization methods suitable for preparing polymeric dispersants include free radical polymerization (FRP) and controlled polymerization techniques. Suitable controlled radical polymerization methods include:

RAFT: reversible addition-fragmentation chain transfer;
ATRP: atom transfer radical polymerization
MADIX: reversible addition-fragmentation chain transfer process, using a transfer active xanthate;
Catalytic chain transfer (e.g. using cobalt complexes);
Nitroxide (e.g. TEMPO) mediated polymerizations;
Other suitable controlled polymerization methods include:
GTP: group transfer polymerization;
Living cationic (ring-opening) polymerizations;
Anionic co-ordination insertion ring-opening polymerization; and
Living anionic (ring-opening) polymerization.

Reversible addition-fragmentation transfer (RAFT): controlled polymerization occurs via rapid chain transfer between growing polymer radicals and dormant polymer chains. A review article on RAFT synthesis of dispersants with different polymeric geometry is given in QUINN J. F. et al., Facile Synthesis of comb, star, and graft polymers via reversible addition-fragmentation chain transfer (RAFT) polymerization, Journal of Polymer Science, Part A: Polymer Chemistry, Vol. 40, 2956-2966, 2002.

Group transfer polymerization (GTP): the method of GTP used for synthesis of AB block copolymers is disclosed by SPINELLI, Harry J, GTP and its use in water based pigment dispersants and emulsion stabilisers, Proc. of 20th Int. Conf. Org. Coat. Sci. Technol., New Platz, N.Y., State Univ. N.Y., Inst. Mater. Sci. p. 511-518.

The synthesis of dendritic polymers is described in the literature. The synthesis of dendrimers in NEWCOME, G. R., et al. Dendritic Molecules: Concepts, Synthesis, Perspectives. VCH: WEINHEIM, 2001. Hyperbranching polymerization is described by BURCHARD, W. Solution properties of branched macromolecules. *Advances in Polymer Science.* 1999, vol. 143, no. II, p. 113-194. Hyperbranched materials can be obtained by polyfunctional polycondensation as disclosed by FLORY, P. J. Molecular size distribution in three-dimensional polymers. VI. Branched polymer containing A-R-Bf-1-type units. *Journal of the American Chemical Society.* 1952, vol. 74, p. 2718-1723.

Living cationic polymerizations is e.g. used for the synthesis of polyvinyl ethers as disclosed in WO 2005012444 (CANON), US 20050197424 (CANON) and US 200501768454 (CANON). Anionic co-ordination ring-opening polymerization is e.g. used for the synthesis of polyesters based on lactones. Living anionic ring-opening polymerization is e.g. used for the synthesis of polyethylene oxide macromers.

Free radical Polymerization (FRP) proceeds via a chain mechanism, which basically consists of four different types of reactions involving free radicals: (1) radical generation from non-radical species (initiation), (2) radical addition to a substituted alkene (propagation), (3) atom transfer and atom abstraction reactions (chain transfer and termination by disproportionation), and (4) radical-radical recombination reactions (termination by recombination).

Polymeric dispersants having several of the above polymer compositions are disclosed in U.S. Pat. No. 6,022,908 (HEWLETT-PACKARD COMPANY), U.S. Pat. No. 5,302,197 (DU PONT) and U.S. Pat. No. 6,528,557 (XEROX CORPORATION).

Suitable random copolymeric dispersants are disclosed in U.S. Pat. No. 5,648,405 (DU PONT), U.S. Pat. No. 6,245,832 (FUJI XEROX), U.S. Pat. No. 6,262,207 (3M INNOVATIVE PROPERTIES COMPANY), US 20050004262 (KAO CORPORATION) and U.S. Pat. No. 6,852,777B1 (KAO CORPORATION).

Suitable alternating copolymeric dispersants are described in US 20030017271 (AKZO NOBEL N.V.).

Suitable block copolymeric dispersants have been described in numerous patents, especially block copolymeric dispersants containing hydrophobic and hydrophilic blocks. For example, U.S. Pat. No. 5,859,113 (DU PONT) discloses AB block copolymers, U.S. Pat. No. 6,413,306 (DU PONT) discloses ABC block copolymers.

Suitable graft copolymeric dispersants are described in CA 2157361 (DU PONT) (hydrophobic polymeric backbone and hydrophilic side chains); other graft copolymeric dispersants are disclosed in U.S. Pat. No. 6,652,634 (LEXMARK), U.S. Pat. No. 6,521,715 (DU PONT) and US 2004102541 (LEXMARK).

Suitable branched copolymeric dispersants are described in U.S. Pat. No. 6,005,023 (DU PONT), U.S. Pat. No. 6,031,019 (KAO CORPORATION), U.S. Pat. No. 6,127,453 (EASTMAN KODAK).

Suitable dendritic copolymeric dispersants are described in e.g. U.S. Pat. No. 6,518,370 (3M INNOVATIVE PROPERTIES COMPANY), U.S. Pat. No. 6,258,896 (3M INNOVATIVE PROPERTIES COMPANY), WO 2000063305 (GEM GRAVURE CORPORATION), U.S. Pat. No. 6,649,138 (QUANTUM DOT CORPORATION), US 2002256230 (BASF), EP 1351759 (EFKA ADDITIVES), EP 1295919 (EASTMAN KODAK)

Suitable designs of polymeric dispersants for inkjet inks are disclosed in SPINELLI, Harry J., Polymeric Dispersants in Ink Jet technology, *Advanced Materials,* 1998, Vol. 10, no. 15, p. 1215-1218.

The monomers and/or oligomers used to prepare the polymeric dispersant can be any monomer and/or oligomer found in the Polymer Handbook Vol 1+2, 4th edition, edited by J. BRANDRUP et al., Wiley-Interscience, 1999.

Suitable examples of monomers for synthesising polymeric dispersants include: acrylic acid, methacrylic acid, maleic acid (or there salts), maleic anhydride, alkyl(meth) acrylates (linear, branched and cycloalkyl) such as methyl (meth)acrylate, n-butyl(meth)acrylate, tert-butyl(meth)acrylate, cyclohexyl(meth)acrylate, and 2-ethylhexyl(meth) acrylate; aryl(meth)acrylates such as benzyl(meth)acrylate, and phenyl(meth)acrylate; hydroxyalkyl(meth)acrylates such as hydroxyethyl(meth)acrylate, and hydroxypropyl (meth)acrylate; (meth)acrylates with other types of functionalities (e.g. oxiranes, amino, fluoro, polyethylene oxide, phosphate substituted) such as glycidyl(meth)acrylate, dimethylaminoethyl(meth)acrylate, trifluoroethyl acrylate, methoxypolyethyleneglycol(meth)acrylate, and tripropyleneglycol(meth)acrylate phosphate; allyl derivatives such as allyl glycidyl ether; styrenics such as styrene, 4-methylstyrene, 4-hydroxystyrene, 4-acetostyrene, and styrenesulfonic acid; (meth)acrylonitrile; (meth)acrylamides (including N-mono and N,N-disubstituted) such as N-benzyl(meth) acrylamide; maleimides such as N-phenyl maleimide; vinyl derivatives such as vinylalcohol, vinylcaprolactam, vinylpyrrolidone, vinylimidazole, vinylnapthalene, and vinyl halides; vinylethers such as vinylmethyl ether; vinylesters of carboxylic acids such as vinylacetate, vinylbutyrate, and vinyl benzoate. Typical condensation type polymers include polyurethanes, polyamides, polycarbonates, polyethers, polyureas, polyimines, polyimides, polyketones, polyester, polysiloxane, phenol-formaldehyde, urea-formaldehyde, melamine-formaldehyde, polysulfide, polyacetal or combinations thereof.

Suitable copolymeric dispersants are acrylic acid/acrylonitrile copolymer, vinyl acetate/acrylic ester copolymer, acrylic acid/acrylic ester copolymer, styrene/acrylic acid copolymer, styrene/methacrylic acid copolymer, styrene/methacrylic acid/acrylic ester copolymer, styrene/α-methylstyrene/acrylic acid copolymer, styrene/α-methylstyrene/acrylic acid/acrylic ester copolymer, styrene/maleic acid copolymer, styrene/maleic anhydride copolymer, vinylnaphthalene/acrylic acid copolymer, vinylnaphthalene/maleic acid copolymer, vinyl acetate/ethylene copolymer, vinyl acetate/fatty acid/ethylene copolymer, vinyl acetate/maleic ester copolymer, vinyl acetate/crotonic acid copolymer, vinyl acetate/acrylic acid copolymer.

Suitable chemistries of copolymeric dispersants also include:

Copolymers which are the product of a condensation process of poly(ethylene imine) with a carboxylic acid terminated polyester (made by addition polymerization); and Copolymers which are the product of a reaction of multifunctional isocyanate with a mono-substituted active H-containing compound like polyester, with a compound containing two active hydrogens (like a polyether) which serves as a crosslinker and the residual isocyanates being transformed to carbamates or urea with compounds containing active hydrogens and a N-containing ring.

A detailed list of suitable polymeric dispersants is disclosed by MC CUTCHEON, Functional Materials, North American Edition, Glen Rock, N.J.: Manufacturing Confectioner Publishing Co., 1990, p. 110-129.

Suitable pigment stabilisers are also disclosed in DE 19636382 (BAYER), U.S. Pat. No. 5,720,802 (XEROX), U.S. Pat. No. 5,713,993 (DU PONT), PCT/GB95/02501, U.S. Pat. No. 5,085,689 (BASF) and U.S. Pat. No. 2,303,376 (FUJITSU ISOTEC).

The pigment dispersion can contain one polymeric dispersant or a mixture of two or more polymeric dispersants to improve the dispersion stability further. Sometimes surfactants can also be used as pigment dispersants, thus a combination of a polymeric dispersant with a surfactant is also possible.

The polymeric dispersant can be non-ionic, anionic or cationic in nature; salts of the ionic dispersants can also be used.

The polymeric dispersant has preferably a polymerization degree DP between 5 and 1000, more preferably between 10 and 500 and most preferably between 10 and 100.

The polymeric dispersant has preferably a number average molecular weight Mn between 500 and 30000, more preferably between 1500 and 10000.

The polymeric dispersant has preferably an average molecular weight Mw smaller than 100000, more preferably smaller than 50000 and most preferably smaller than 30000.

The polymeric dispersant has preferably a polymeric dispersity PD smaller than 2, more preferably smaller than 1.75 and most preferably smaller than 1.5.

Commercial examples of polymeric dispersants are the following:

DISPERBYK™ M dispersants available from BYK CHEMIE GMBH;
SOLSPERSE™ dispersants available from NOVEON;
TEGO™ DISPERS™ dispersants from DEGUSSA;
EDAPLAN™ dispersants from MÜNZING CHEMIE;
ETHACRYL™ M dispersants from LYONDELL;
GANEX™ dispersants from ISP;
DISPEX™ and EFKA™ dispersants from CIBA SPECIALTY CHEMICALS INC;
DISPONER™ dispersants from DEUCHEM; and
JONCRYL™ dispersants from JOHNSON POLYMER.

Particularly preferred for curable ink jet inks include SOLSPERSE™ dispersants from NOVEON, EFKA™ dispersants from CIBA SPECIALTY CHEMICALS INC and DISPERBYK™ dispersants from BYK CHEMIE GMBH.

Particularly preferred dispersants for curable ink jet inks are SOLSPERSE™ 32000, 35000 and 39000 dispersants from NOVEON.

The polymeric dispersant is preferably used in the curable pigment inkjet ink in an amount of 2 to 600 wt %, more preferably 5 to 200 wt % based on the weight of the pigment.

Dispersion Synergists

A dispersion synergist is used for improving the dispersion quality and stability of pigment dispersions and inkjet inks.

One or more of the curable pigment inkjet inks of the curable pigment inkjet ink set according to the present invention may contain a dispersion synergist. A mixture of dispersion synergists can be used to further improve dispersion stability.

The dispersion synergist usually consists of an anionic part and a cationic part. The anionic part of the dispersion synergist exhibit is often a certain molecular similarity with the colour pigment and the cationic part of the dispersion synergist consists of one or more protons and/or cations to compensate the charge of the anionic part of the dispersion synergist.

The curable magenta inkjet ink of the curable pigment inkjet ink set according to the present invention preferably contains a dispersion synergist.

A preferred dispersion synergist used in the curable magenta inkjet ink is a quinacridone derivative represented by Formula (I):

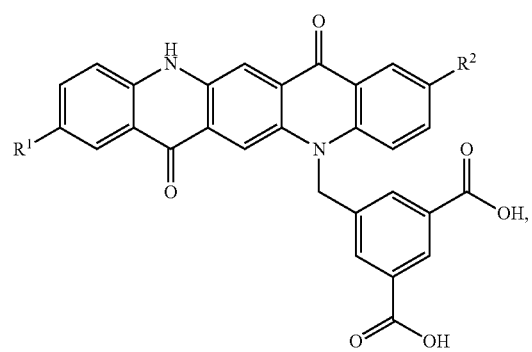

Formula (I)

wherein $R^1$ and $R^2$ are each independently selected from the group consisting of hydrogen, methyl and halogen.

The preferred quinacridone derivative QAD-1 is represented by formula:

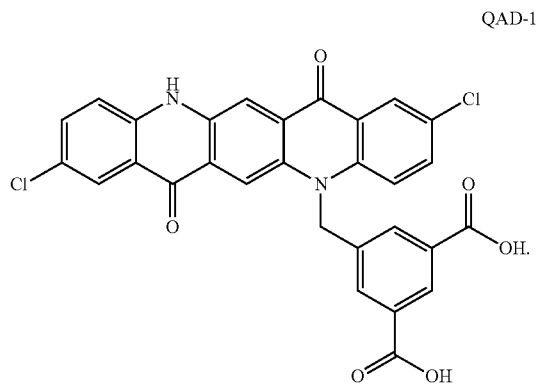

QAD-1

A mixture of the quinacridone derivative according to Formula (I) and one or more other dispersion synergists may also be used to obtain better dispersion quality and stability. In another embodiment the dispersion synergist is a salt of the quinacridone derivative.

In case that the dispersion synergist contains a salt of a carboxylic acid group, the charge of the carboxylate anion is compensated by a cation.

The cation may be an inorganic cation selected from the group consisting of the Ia and IIa metals in the table of Mendeleev. In a preferred embodiment the cation is $Li^+$.

The cation may also be an organic cation. A preferred cation is an ammonium and a substituted ammonium group.

In a preferred embodiment the cation is selected from the substituted ammonium cations disclosed in U.S. Pat. No. 4,461,647 (ICI) U.S. Pat. No. 4,057,436 (ICI) and U.S. Pat. No. 6,641,655 (AVECIA) incorporated herein by reference.

Particularly preferred cations include the substituted ammonium groups selected from the group consisting of $^+N(CH_3)_2(C_{18}H_{37})_2$, $^+NH(CH_3)_2(C_{18}H_{37})$, $^+N(CH_3)_2(C_{12}H_{25})_2$, $^+NH(CH_3)_2(C_{12}H_{25})$, $^+N(CH_3)_2(C_{10}H_{21})_2$, $^+NH(CH_3)_2(C_{10}H_{21})$, $^+NH(CH_3)_2(C_8H_{17})_2$, $^+NH(CH_3)_2(C_8H_{17})$, $^+NH(C_8H_{17})_3$, $^+NH(C_{10}H_{21})_3$, $^+NH(C_{12}H_{25})_3$ and $^+NH(C_{18}H_{35})_3$.

The dispersion synergist is preferably added in an amount between 0.1 and 20 wt % based upon the weight of the pigment.

The synergist is preferably added in a smaller amount than the polymeric dispersant(s). The ratio of polymeric dispersant/dispersion synergist depends upon the pigment and should be determined experimentally. Typically the ratio wt % polymeric dispersant/wt % dispersion synergist is selected between 2:1 to 100:1, preferably between 2:1 and 20:1.

Suitable dispersion synergists that are commercially available include SOLSPERSE™ 5000 and SOLSPERSE™ 22000 from NOVEON. In dispersing C.I. Pigment Blue 15:3, the use of a sulfonated Cu-phthalocyanine dispersion synergist, e.g. SOLSPERSE™ 5000 from NOVEON is preferred.

Monomers and Oligomers

Any monomer or oligomer may be used as curable compound in the curable pigment inkjet inks of the curable pigment inkjet ink set according to the present invention. A combination of monomers, oligomers and/or prepolymers may also be used. The monomers, oligomers and/or prepolymers may possess different degrees of functionality, and a mixture including combinations of mono-, di-, tri- and higher functionality monomers, oligomers and/or prepolymers may be used. The viscosity of the inkjet ink can be adjusted by varying the ratio between the monomers and oligomers.

Any method of conventional radical polymerization, photo-curing system using photo acid or photo base generator, or photo induction alternating copolymerization may be employed. In general, radical polymerization and cationic polymerization are preferred, and photo induction alternating copolymerization needing no initiator may also be employed. Furthermore, a hybrid system of combinations of these systems is also effective.

Cationic polymerization is superior in effectiveness due to lack of inhibition of the polymerization by oxygen, however it is expensive and slow, especially under conditions of high relative humidity. If cationic polymerization is used, it is preferred to use an epoxy compound together with an oxetane compound to increase the rate of polymerization. Radical polymerization is the preferred polymerization process.

Any polymerizable compound commonly known in the art may be employed. Particularly preferred for use as a radiation curable compound in the radiation curable inkjet ink are monofunctional and/or polyfunctional acrylate monomers, oligomers or prepolymers, such as isoamyl acrylate, stearyl acrylate, lauryl acrylate, octyl acrylate, decyl acrylate, isoamylstyl acrylate, isostearyl acrylate, 2-ethylhexyl-diglycol acrylate, 2-hydroxybutyl acrylate, 2-acryloyloxyethyl-hexahydrophthalic acid, butoxyethyl acrylate, ethoxydiethylene glycol acrylate, methoxydiethylene glycol acrylate, methoxypolyethylene glycol acrylate, methoxypropylene glycol acrylate, phenoxyethyl acrylate, tetrahydrofurfuryl acrylate, isobornyl acrylate, 2-hydroxyethyl acrylate, 2-hydroxypropyl acrylate, 2-hydroxy-3-phenoxypropyl acrylate, vinyl ether acrylate, 2-acryloyloxyethylsuccinic acid, 2-acryloyxyethylphthalic acid, 2-acryloxyethyl-2-hydroxyethylphthalic acid, lactone modified flexible acrylate, and t-butylcyclohexyl acrylate, triethylene glycol diacrylate, tetraethylene glycol diacrylate, polyethylene glycol diacrylate, dipropylene glycol diacrylate, tripropylene glycol diacrylate, polypropylene glycol diacrylate, 1,4-butanediol diacrylate, 1,6-hexanediol diacrylate, 1,9-nonanediol diacrylate, neopentyl glycol diacrylate, dimethylol-tricyclodecane diacrylate, bisphenol A EO (ethylene oxide) adduct diacrylate, bisphenol A PO (propylene oxide) adduct diacrylate, hydroxypivalate neopentyl glycol diacrylate, propoxylated neopentyl glycol diacrylate, alkoxylated dimethyloltricyclodecane diacrylate and polytetramethylene glycol diacrylate, trimethylolpropane triacrylate, EO modified trimethylolpropane triacrylate, tri(propylene glycol)triacrylate, caprolactone modified trimethylolpropane triacrylate, pentaerythritol triacrylate, pentaerithritol tetraacrylate, pentaerythritolethoxy tetraacrylate, dipentaerythritol hexaacrylate, ditrimethylolpropane tetraacrylate, glycerinpropoxy triacrylate, and caprolactam modified dipentaerythritol hexaacrylate, or an N-vinylamide such as, N-vinylcaprolactam or N-vinylformamide or acrylamide or a substituted acrylamide, such as acryloylmorpholine.

Other suitable monofunctional acrylates include caprolactone acrylate, cyclic trimethylolpropane formal acrylate, ethoxylated nonyl phenol acrylate, isodecyl acrylate, isooctyl acrylate, octyldecyl acrylate, alkoxylated phenol acrylate, tridecyl acrylate and alkoxylated cyclohexanone dimethanol diacrylate.

Other suitable difunctional acrylates include alkoxylated cyclohexanone dimethanol diacrylate, alkoxylated hexanediol diacrylate, dioxane glycol diacrylate, dioxane glycol diacrylate, cyclohexanone dimethanol diacrylate, diethylene glycol diacrylate and neopentyl glycol diacrylate.

Other suitable trifunctional acrylates include propoxylated glycerine triacrylate and propoxylated trimethylolpropane triacrylate.

Other higher functional acrylates include di-trimethylolpropane tetraacrylate, dipentaerythritol pentaacrylate, ethoxylated pentaeryhtitol tetraacrylate, methoxylated glycol acrylates and acrylate esters.

Furthermore, methacrylates corresponding to the above-mentioned acrylates may be used with these acrylates. Of the methacrylates, methoxypolyethylene glycol methacrylate, methoxytriethylene glycol methacrylate, hydroxyethyl methacrylate, phenoxyethyl methacrylate, cyclohexyl methacrylate, tetraethylene glycol dimethacrylate, and polyethylene glycol dimethacrylate are preferred due to their relatively high sensitivity and higher adhesion to an ink-receiver surface.

Furthermore, the inkjet inks may also contain polymerizable oligomers. Examples of these polymerizable oligomers include epoxy acrylates, aliphatic urethane acrylates, aromatic urethane acrylates, polyester acrylates, and straight-chained acrylic oligomers.

Suitable examples of styrene compounds are styrene, p-methylstyrene, p-methoxystyrene, b-methylstyrene, p-methy-b-methylstyrene, a-methylstyrene and p-methoxy-b-methylstyrene.

Suitable examples of vinylnaphthalene compounds are 1-vinylnaphthalene, a-methyl-1-vinylnaphthalene, b-methyl-1-vinylnaphthalene, 4-methyl-1-vinylnaphthalene and 4-methoxy-1-vinylnaphthalene.

Suitable examples of N-vinyl heterocyclic compounds are N-vinylcarbazole, N-vinylpyrrolidone, N-vinylindole, N-vinylpyrrole, N-vinylphenothiazine, N-vinylacetoanilide, N-vinylethylacetoamide, N-vinylsuccinimide, N-vinylphthalimide, N-vinylcaprolactam and N-vinylimidazole.

The cationically polymerizable compound of the inkjet ink can be one or more monomers, one or more oligomers or a combination thereof.

Suitable examples of cationically curable compounds can be found in Advances in Polymer Science, 62, pages 1 to 47 (1984) by J. V. Crivello.

The cationic curable compound may conatin at least one olefin, thioether, acetal, thioxane, thietane, aziridine, N, O, S or P heterocycle, aldehyde, lactam or cyclic ester group.

Examples of cationic polymerizable compounds include monomers and/or oligomers epoxides, vinyl ethers, styrenes, oxetanes, oxazolines, vinylnaphthalenes, N-vinyl heterocyclic compounds, tetrahydrofurfuryl compounds.

The cationically polymerizable monomer can be mono-, di- or multi-functional or a mixture thereof.

Suitable cationic curable compounds having at least one epoxy group are listed in the "Handbook of Epoxy Resins" by Lee and Neville, McGraw Hill Book Company, New York (1967) and in "Epoxy Resin Technology" by P. F. Bruins, John Wiley and Sons New York (1968).

Examples of cationic curable compounds having at least one epoxy group include 1,4-butanediol diglycidyl ether, 3-(bis(gycidyloxymethyl)methoxy)-1,2-propane diol, limonene oxide, 2-biphenyl gycidyl ether, 3,4-epoxycyclohexylmethyl-3',4'-epoxycyclohexane carboxylate, epichlorohydrin-bisphenol S based epoxides, epoxidized styrenics and more epichlorohydrin-bisphenol F and A based epoxides and epoxidized novolaks.

Suitable epoxy compounds comprising at least two epoxy groups in the molecule are alicyclic polyepoxide, polyglycidyl ester of polybasic acid, polyglycidyl ether of polyol, polyglycidyl ether of polyoxyalkylene glycol, polyglycidyl ester of aromatic polyol, polyglycidyl ether of aromatic polyol, urethane polyepoxy compound, and polyepoxy polybutadiene.

Examples of cycloaliphatic diepoxides include copolymers of epoxides and hydroxyl components such as glycols, polyols, or vinyl ether, such as 3,4-epoxycyclohexylmethyl-3',4'-epoxycyclohexylcarboxylate; bis(3,4-epoxycylohexylmethyl)adipate; limonene diepoxide; diglycidyl ester of hexahydrophthalic acid.

Examples of vinyl ethers having at least one vinyl ether group include ethyl vinyl ether, n-butyl vinyl ether, isobutyl vinyl ether, octadecyl vinyl ether, cyclohexyl vinyl ether, butanediol divinyl ether, hydroxyl butyl vinyl ether, cyclohexane dimethanol monovinyl ether, phenyl vinyl ether, p-methylphenyl vinyl ether, p-methoxyphenyl vinyl ether, a-methylphenyl vinyl ether, b-methylisobutyl vinyl ether and b-chloroisobutyl vinyl ether, diethyleneglycol divinyl ether, triethylene glycol divinyl ether, n-propyl vinyl ether, isopropyl vinyl ether, dodecyl vinyl ether, diethylene glycol monovinyl ether, cyclohexanedimethanol divinyl ether, 4-(vinyloxy)butyl benzoate, bis[4-(vinyl oxy)butyl]adipate, bis[4-(vinyl oxy)butyl]succinate, 4-(vinyloxy methyl)cyclohexylmethyl benzoate, bis[4-(vinyloxy)butyl]isophthalate, bis[4-(vinyloxymethyl)cyclohexylmethyl]glutarate, tris[4-(vinyloxy)butyl]trimellitate, 4-(vinyloxy)butyl steatite, bis[4-(vinyloxy)butyl]hexanediylbiscarbamate, bis[4-(vinyloxy)methyl]cyclohexyl]methyl]terephthalate, bis[4-(vinyloxy)methyl]cyclohexyl]methyl]isophthalate, bis[4-(vinyloxy)butyl](4-methyl-1,3-phenylene)-biscarbamate, bis[4-vinyloxy)butyl](methylenedi-4,1-phenylene) biscarbamate and 3-amino-1-propanol vinyl ether.

Suitable examples of oxetane compounds having at least one oxetane group include 3-ethyl-3-hydroloxymethyl-1-oxetane, the oligomeric mixture 1,4-bis[3-ethyl-3-oxetanyl methoxy)methyl]benzene, 3-ethyl-3-phenoxymethyl-oxetane, bis([1-ethyl(3-oxetanil)]methyl)ether, 3-ethyl-3-[(2-ethylhexyloxy)methyl]oxetane, 3-ethyl-[(tri-ethoxysilyl propoxy)methyl]oxetane and 3,3-dimethyl-2(p-methoxyphenyl)-oxetane.

Initiators

The curable pigment inkjet inks of the curable pigment inkjet ink set used according to the present invention preferably also contain an initiator. The initiator typically initiates the polymerization reaction. The initiator can be a thermal initiator, but is preferably a photo-initiator. The photo-initiator requires less energy to activate than the monomers, oligomers and/or prepolymers to form the polymer. The photo-initiator suitable for use in the curable pigment inkjet inks may be a Norrish type I initiator, a Norrish type II initiator or a photo-acid generator.

Thermal initiator(s) suitable for use in the curable inkjet ink include tert-amyl peroxybenzoate, 4,4-azobis(4-cyanovaleric acid), 1,1'-azobis(cyclohexanecarbonitrile), 2,2'-azobisisobutyronitrile (AIBN), benzoyl peroxide, 2,2-bis(tert-butylperoxy)butane, 1,1-bis(tert-butylperoxy)cyclohexane, 1,1-Bis(tert-butylperoxy)cyclohexane, 2,5-bis(tert-butylperoxy)-2,5-dimethylhexane, 2,5-bis(tert-butylperoxy)-2,5-dimethyl-3-hexyne, bis(1-(tert-butylperoxy)-1-methylethyl)benzene, 1,1-bis(tert-butylperoxy)-3,3,5-trimethylcyclohexane, tert-butyl hydroperoxide, tert-butyl peracetate, tert-butyl peroxide, tert-butyl peroxybenzoate, tert-butylperoxy isopropyl carbonate, cumene hydroperoxide, cyclohexanone peroxide, dicumyl peroxide, lauroyl peroxide, 2,4-pentanedione peroxide, peracetic acid and potassium persulfate.

The photo-initiator or photo-initiator system absorbs light and is responsible for the production of initiating species, such as free radicals and cations. Free radicals and cations are high-energy species that induce polymerization of monomers, oligomers and polymers and with polyfunctional monomers and oligomers thereby also inducing cross-linking.

Irradiation with actinic radiation may be realized in two steps by changing wavelength or intensity. In such cases it is preferred to use 2 types of photo-initiator together.

A combination of different types of initiator, for example, a photo-initiator and a thermal initiator can also be used.

A preferred Norrish type I-initiator is selected from the group consisting of benzoinethers, benzil ketals, α,α-dialkoxyacetophenones, α-hydroxyalkylphenones, α-aminoalkylphenones, acylphosphine oxides, acylphosphine sulphides, α-haloketones, α-halosulfones and α-halophenylglyoxalates.

A preferred Norrish type II-initiator is selected from the group consisting of benzophenones, thioxanthones, 1,2-diketones and anthraquinones. A preferred co-initiator is selected from the group consisting of an aliphatic amine, an aromatic amine and a thiol. Tertiary amines, heterocyclic thiols and 4-dialkylamino-benzoic acid are particularly preferred as co-initiator.

Suitable photo-initiators are disclosed in CRIVELLO, J. V., et al. VOLUME III: Photoinitiators for Free Radical Cationic. 2nd edition. Edited by BRADLEY, G. London, UK: John Wiley and Sons Ltd, 1998. p. 287-294.

Specific examples of photo-initiators may include, but are not limited to, the following compounds or combinations thereof: benzophenone and substituted benzophenones, 1-hydroxycyclohexyl phenyl ketone, thioxanthones such as isopropylthioxanthone, 2-hydroxy-2-methyl-1-phenylpropan-1-one, 2-benzyl-2-dimethylamino-(4-morpholinophenyl) butan-1-one, benzil dimethylketal, bis(2,6-dimethylbenzoyl)-2,4,4-trimethylpentylphosphine oxide, 2,4,6trimethylbenzoyldiphenylphosphine oxide, 2-methyl-1-[4-(methylthio)phenyl]-2-morpholinopropan-1-one, 2,2-dimethoxy-1,2-diphenylethan-1-one or 5,7-diiodo-3-butoxy-6-fluorone, diphenyliodonium fluoride and triphenylsulfonium hexafluophosphate.

Suitable commercial photo-initiators include IRGACURE™ 184, IRGACURE™ 500, IRGACURE™ 907, IRGACURE™ 369, IRGACURE™ 1700, IRGACURE™ 651, IRGACURE™ 819, IRGACURE™ 1000, IRGACURE™ 1300, IRGACURE™ 1870, DAROCUR™ 1173, DAROCUR™ 2959, DAROCUR™ 4265 and DAROCUR™ ITX available from CIBA SPECIALTY CHEMICALS, Lucerin TPO available from BASF AG, ESACURE™ KT046, ESACURE™ KIP150, ESACURE™ KT37 and ESACURE™ EDB available from LAMBERTI, H-NU™ 470 and H-NU™ 470X available from SPECTRA GROUP Ltd.

Suitable cationic photo-initiators include compounds, which form aprotic acids or Bronstead acids upon exposure to ultraviolet and/or visible light sufficient to initiate polymerization. The photo-initiator used may be a single compound, a mixture of two or more active compounds, or a combination of two or more different compounds, i.e. co-initiators. Non-limiting examples of suitable cationic photo-initiators are aryldiazonium salts, diaryliodonium salts, triarylsulphonium salts, triarylselenonium salts and the like.

The curable pigment inkjet inks may contain a photo-initiator system containing one or more photo-initiators and one or more sensitizers that transfer energy to the photo-initiator(s). Suitable sensitizers include photoreducible xanthene, fluorene, benzoxanthene, benzothioxanthene, thiazine, oxazine, coumarin, pyronine, porphyrin, acridine, azo, diazo, cyanine, merocyanine, diarylmethyl, triarylmethyl, anthraquinone, phenylenediamine, benzimidazole, fluorochrome, quinoline, tetrazole, naphthol, benzidine, rhodamine, indigo and/or indanthrene dyes. The amount of the sensitizer is in general from 0.01 to 15 wt %, preferably from 0.05 to 5 wt %, based in each case on the total weight of the curable pigment inkjet ink.

In order to increase the photosensitivity further, the curable pigment inkjet inks may additionally contain co-initiators. For example, the combination of titanocenes and trichloromethyl-s-triazines, of titanocenes and ketoxime ethers and of acridines and trichloromethyl-s-triazines is known. A further increase in sensitivity can be achieved by adding dibenzalacetone or amino acid derivatives. The amount of co-initiator or co-initiators is in general from 0.01 to 20 wt %, preferably from 0.05 to 10 wt %, based in each case on the total weight of the curable pigment inkjet ink.

A preferred initiator system is 2,2'-bis(o-chlorophenyl)-4, 4',5,5'-tetraphenyl-(7CI,8CI)4,4'-Bi-4H-imidazole corresponding to the chemical formula:

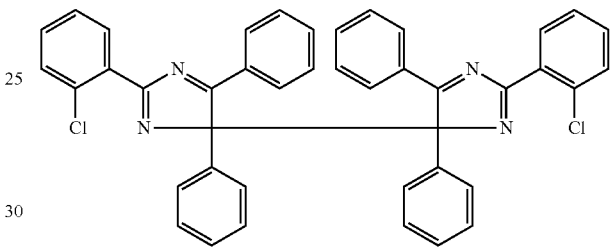

in the presence of a co-initiator such as 2-mercapto benzoxazole.

Another preferred type of initiator is an oxime ester. A suitable example has as chemical formula:

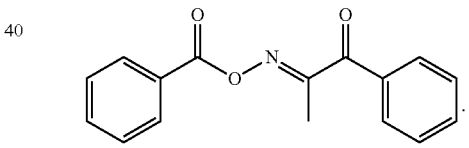

A preferred amount of initiator is 0.3-50 wt % of the total weight of the curable liquid, and more preferably 1-15 wt % of the total weight of the curable pigment inkjet ink.

Irradiation with actinic radiation may be realized in two steps by changing wavelength or intensity. In such cases it is preferred to use 2 types of photo-initiator together.

Inhibitors

Radiation curable inkjet inks according to the present invention may contain a polymerization inhibitor. Suitable polymerization inhibitors include phenol type antioxidants, hindered amine light stabilizers, phosphor type antioxidants, hydroquinone monomethyl ether commonly used in (meth) acrylate monomers, and hydroquinone, t-butylcatechol, pyrogallol may also be used.

Suitable commercial inhibitors are, for example, SUMILIZER™ GA-80, SUMILIZER™ GM and SUMILIZER™ GS produced by Sumitomo Chemical Co. Ltd.; GENORAD™ 16, GENORAD™ 18 and GENORAD™ 20 from Rahn AG; IRGASTAB™ UV10 and IRGASTAB™ UV22, TINUVIN™ 460 and CGS20 from Ciba Specialty Chemicals; FLOORSTAB™ UV range (UV-1, UV-2, UV-5 and UV-8) from Kromachem Ltd. ADDITOL™ S range (S100, S110, S120 and S130) from Cytec Surface Specialties.

Since excessive addition of these polymerization inhibitors will lower the ink sensitivity to curing, it is preferred that the amount capable of preventing polymerization is determined prior to blending. The amount of a polymerization inhibitor is preferably lower than 2 wt % of the total ink.

Surfactants

The curable pigment inkjet inks may contain at least one surfactant. The surfactant(s) can be anionic, cationic, non-ionic, or zwitter-ionic and are usually added in a total quantity below 20 wt % based on the total ink weight and particularly in a total below 10 wt % based on the total ink weight.

A fluorinated or silicone compound may be used as a surfactant, preferably a cross-linkable surfactant is used. Polymerizable monomers having surface-active effects include silicone modified acrylates, silicone modified methacrylates, acrylated siloxanes, polyether modified acrylic modified siloxanes, fluorinated acrylates, and fluorinated methacrylates. Polymerizable monomers having surface-active effects can be mono-, di-, tri- or higher functional (meth) acrylates or mixtures thereof.

Preparation of an Inkjet Ink

The curable pigment inkjet inks of the curable pigment inkjet ink set according to the present invention may be prepared by milling the pigment in the dispersion medium, preferably in the presence of a polymeric dispersant.

Mixing apparatuses may include a pressure kneader, an open kneader, a planetary mixer, a dissolver, and a Dalton Universal Mixer. Suitable milling and dispersion apparatuses are a ball mill, a pearl mill, a colloid mill, a high-speed disperser, double rollers, a bead mill, a paint conditioner, and triple rollers. The dispersions may also be prepared using ultrasonic energy.

Many different types of materials may be used as milling media, such as glasses, ceramics, metals, and plastics. In a preferred embodiment, the grinding media can comprise particles, preferably substantially spherical in shape, e.g. beads consisting essentially of a polymeric resin or yttrium stabilized zirconium oxide beads.

In the process of mixing, milling and dispersion, each process is performed with cooling to prevent build up of heat, and as much as possible under light conditions in which actinic radiation has been substantially excluded.

The curable pigment inkjet ink may contain more than one pigment, the inkjet ink may be prepared using separate dispersions for each pigment, or alternatively several pigments may be mixed and co-milled in preparing the dispersion.

The dispersion process can be carried out in a continuous, batch or semi-batch mode.

The preferred amounts and ratios of the ingredients of the mill grind will vary widely depending upon the specific materials and the intended applications. The contents of the milling mixture comprise the mill grind and the milling media. The mill grind comprises pigment, polymeric dispersant and a liquid carrier. For inkjet inks, the pigment is usually present in the mill grind at 1 to 50 wt %, excluding the milling media. The weight ratio of pigment over polymeric dispersant is 20:1 to 1:2.

The milling time can vary widely and depends upon the pigment, the selected mechanical devices and residence conditions, the initial and desired final particle size, etc. In the present invention pigment dispersions with an average particle size of less than 150 nm may be prepared.

After milling is completed, the milling media is separated from the milled particulate product (in either a dry or liquid dispersion form) using conventional separation techniques, such as by filtration, sieving through a mesh screen, and the like. Often the sieve is built into the mill, e.g. for a bead mill. The milled pigment concentrate is preferably separated from the milling media by filtration.

In general it is desirable to make the inkjet inks in the form of a concentrated mill grind, which is subsequently diluted to the appropriate concentration for use in the inkjet printing system. This technique permits preparation of a greater quantity of pigmented ink from the equipment. By dilution, the inkjet ink is adjusted to the desired viscosity, surface tension, colour, hue, saturation density, and print area coverage for the particular application.

In preparing the inkjet ink, it is preferred that one or more degassing steps are performed at one time or another for removing air or gas bubbles from the ink. Degassing is preferably performed by heating and/or reduced pressure. The degassing step(s) can be performed on the concentrated pigment dispersion and/or on the final inkjet ink composition.

Printing Device

The inks of the curable pigment inkjet ink set according to the present invention may be jetted by one or more printing heads ejecting small droplets of ink in a controlled manner through nozzles onto an ink-receiver surface, which is moving relative to the printing head(s).

A preferred printing head for the inkjet printing system is a piezoelectric head. Piezoelectric inkjet printing is based on the movement of a piezoelectric ceramic transducer when a voltage is applied thereto. The application of a voltage changes the shape of the piezoelectric ceramic transducer in the printing head creating a void, which is then filled with ink. When the voltage is again removed, the ceramic expands to its original shape, ejecting a drop of ink from the print head. However the inkjet printing method according to the present invention is not restricted to piezoelectric inkjet printing. Other inkjet printing heads can be used and include various types, such as a continuous type and thermal, electrostatic and acoustic drop on demand type.

At high printing speeds, the inks must be ejected readily from the printing heads, which puts a number of constraints on the physical properties of the ink, e.g. a low viscosity at the jetting temperature, which may vary from 25° C. to 110° C., a surface energy such that the printing head nozzle can form the necessary small droplets, a homogenous ink capable of rapid conversion to a dry printed area, . . . .

The inkjet printing head normally scans back and forth in a transversal direction across the moving ink-receiver surface. Often the inkjet print head does not print on the way back. Bi-directional printing is preferred for obtaining a high areal throughput. Another preferred printing method is by a "single pass printing process", which can be performed by using page wide inkjet printing heads or multiple staggered inkjet printing heads which cover the entire width of the ink-receiver surface. In a single pass printing process the inkjet printing heads usually remain stationary and the ink-receiver surface is transported under the inkjet printing heads.

Curing Device

The curable pigment inkjet inks of the ink set can be cured by exposing them to actinic radiation, by thermal curing and/or by electron beam curing. A preferred means of radiation curing is ultraviolet radiation. Preferably the curing is performed by an overall exposure to actinic radiation, by overall thermal curing and/or by overall electron beam curing.

The curing device may be arranged in combination with the print head of the inkjet printer, travelling therewith so that the curable liquid is exposed to curing radiation very shortly after been jetted.

In such an arrangement it can be difficult to provide a small enough radiation source connected to and travelling with the print head. Therefore, a static fixed radiation source may be employed, e.g. a source of curing UV-light, connected to the radiation source by means of a flexible radiation conductive device such as a fibre optic bundle or an internally reflective flexible tube.

Alternatively, the actinic radiation may be supplied from a fixed source to the radiation head by an arrangement of mirrors including a mirror upon the radiation head.

The source of radiation arranged not to move with the print head, may also be an elongated radiation source extending transversely across the ink-receiver surface to be cured and adjacent the transverse path of the print head so that the subsequent rows of images formed by the print head are passed, stepwise or continually, beneath that radiation source.

Any ultraviolet light source, as long as part of the emitted light can be absorbed by the photo-initiator or photo-initiator system, may be employed as a radiation source, such as, a high or low pressure mercury lamp, a cold cathode tube, a black light, an ultraviolet LED, an ultraviolet laser, and a flash light. Of these, the preferred source is one exhibiting a relatively long wavelength UV-contribution having a dominant wavelength of 300-400 nm. Specifically, a UV-A light source is preferred due to the reduced light scattering therewith resulting in more efficient interior curing.

UV radiation is generally classed as UV-A, UV-B, and UV-C as follows:

UV-A: 400 nm to 320 nm
UV-B: 320 nm to 290 nm
UV-C: 290 nm to 100 nm.

Furthermore, it is possible to cure the image using, consecutively or simultaneously, two light sources of differing wavelength or illuminance. For example, the first UV-source can be selected to be rich in UV-C, in particular in the range of 260 nm-200 nm. The second UV-source can then be rich in UV-A, e.g. a gallium-doped lamp, or a different lamp high in both UV-A and UV-B. The use of two UV-sources has been found to have advantages e.g. a fast curing speed.

For facilitating curing, the inkjet printer often includes one or more oxygen depletion units. The oxygen depletion units place a blanket of nitrogen or other relatively inert gas (e.g. $CO_2$), with adjustable position and adjustable inert gas concentration, in order to reduce the oxygen concentration in the curing environment. Residual oxygen levels are usually maintained as low as 200 ppm, but are generally in the range of 200 ppm to 1200 ppm.

Thermal curing can be performed image-wise by use of a thermal head, a heat stylus, hot stamping, a laser beam, etc. If a laser beam is used, then preferably an infrared laser is used in combination with an infrared dye in the curable ink.

Calculation of Colour Gamut

In order to avoid a cumbersome measurement of colour gamut, methods have been developed to calculate the potential gamut volume of colour devices and colour images. Important references are:

U.S. Pat. No. 6,633,408 (KPG) discloses a method of modelling spectral characteristics of a photographic print.

MAHY, M. Gamut calculation of colour reproduction devices. Scottsdale, Ariz.: 4th IS, 1995. p. 145-150 (Volume 4).

SAITO, R., et al. Extraction of Image Gamut Surface and Calculation of its Volume. Scottsdale, Ariz.: 8th IS, 2000. p. 330-334 (Volume 4).

The method for the calculation of the potential colour gamut for an inkjet ink set according to present invention is based on a simulation of the colour gamut of an imaging material in reflection geometry, which can be thought of being produced by a given set of colorants in an idealized printing process. This ideal printing process is characterized by the validity of the Lambert-Beer law for the mixing of colorants within the image receiving layer (inner spectra) and the applicability of the Saunderson equation in order to describe the influence of the effect of the air interface (external spectra). In a second step, a surface triangulation method is used to calculate the volume of the simulated colour gamut. The choice of the ideal printing process facilitates to make abstraction from the limitations of paper, printers and/or printer driver settings in any real printing process, such that two ink sets can objectively be compared based on their spectral properties.

The model of the ideal printing process incorporates the following assumptions:

1. Homogenous distribution of colorants (and their mixtures) jetted on the imaging layer, i.e. continuous-tone printing like in a chromogenic photographic paper. The halftone structure of the printing process is not taken into account: All simulated test-patches are assumed to represent homogenous flat-fields. In addition, light-scattering processes are assumed to be absent within in the image receiving layer, unless the ideal diffuse reflection given by the paper base.

2. Mixtures and variations of the concentration of colorants in/on the imaging layer (inner spectra) are calculated according to the Lambert-Beer law, i.e. linear combination of the colorants absorption spectra in terms of spectral optical density $D_C(\lambda), D_M(\lambda), D_Y(\lambda), D_K(\lambda)$ of C, M, Y and K, respectively, which are initially measured by a spectrophotometer in transmission mode (i.e. liquid solutions of the neat colorants in a quartz cell with a given nominal concentration).

The coefficients c, m and y (0-100%) represent a relative part of the nominal concentration of the colorants and run over all combinations representing the surface of the CMY cube (i.e. at least one of the coefficients c,m,y has the value 0% or 100%).

$$D(\lambda) = c \cdot D_C(\lambda) + m \cdot D_M(\lambda) + y \cdot D_Y(\lambda) + k \cdot D_K(\lambda)$$

$$c, m, y \in [0\% \ldots 100\%]$$

3. In addition, grey component removal is applied, i.e. the grey component $k(D_C(\lambda) + D_M(\lambda) + D_Y(\lambda))$ is replaced by the corresponding amount of k $D_K(\lambda)$, wherein k denotes the minimum of c, m, y.

$$D(\lambda) = (c-k) \cdot D_C(\lambda) + (m-k) \cdot D_M(\lambda) + (y-k) \cdot D_Y(\lambda) + k \cdot D_K(\lambda)$$

$$k = \min(c, m, y)$$

1. Starting from the calculated "internal optical density spectra" $D(\lambda)$ of colorant mixtures assumed to be homogeneously distributed, the optical effect of the air interface has to be taken into account to realistically simulate reflection image behaviour (i.e. "external spectra"). The presence of an air interface introduces two phenomena, namely 1) direct external surface reflections of the incoming light beam (reflectance factor $r_s$) and 2) internal surface reflections of light (reflectance factor $r_i$), that has been diffusely reflected by the substrate (reflectance spectrum $R_s(\lambda)$) at the lower boundary of the imaging layer. The internal reflection at the air interface gives rise to multiple optical reflections within the imaging layer. All these effects are taking into account by the formalism of Saunderson, that allows to calculate external reflection spectra $R_{ext}(l)$ from internal reflection spectra $R_{int}(l)$:

$$R_{ext}(\lambda) = r_s + \frac{(1-r_s)(1-r_i)R_{int}(\lambda)}{1 - r_i R_{int}(\lambda)}$$

$$R_{int}(\lambda) = R_s(\lambda) \cdot 10^{-epl \cdot D(\lambda)}$$

2. The effective pathlength "epl" describes the factor, by which the pathlength of the light inside the imaging layer is increased in comparison to the transmission case. This is due to geometric reasons: light is travelling twice through the layer because of reflection geometry. Furthermore, the pathlength is increased for beams other than normal with respect to the interface. In case of diffuse illumination, another factor 2 is found for the epl.

It is assumed, that $r_s$, $r_i$ and epl do not vary with the wavelength $\lambda$. The parameter settings used are: $r_s=0.001$ (high gloss surface), $r_i=0.6$, epl=2.4 (assuming 45/0 reflection geometry). In accordance with the assumption of an ideal printing process, a substrate without absorption is considered, i.e. $R_s(\lambda)=1$.

1. From the set of reflection spectra, that represent all the combinations of colorants on the surface of the CMY cube, the corresponding set of CIE L*a*b* co-ordinates are calculated based on the CIE 1931 (2 degree) observer and D50 as illuminant.
2. The set of CIE L*a*b* values represents an ordered cloud of points of the surface of the potential colour gamut. To calculate the volume enclosed by these points—i.e. the gamut volume—first a surface triangulation technique is applied (Delaunay type), from which a set of triangle facets is obtained, that completely cover the colour gamut. In a next step, an arbitrarily chosen, but then fixed point inside the cloud of points, e.g. the centre of gravity in terms of L*a*b*) is defined as "inner point". Together with this "inner point" each surface triangle facet forms a tetrahedron, from which the volume can be calculated using standard methods of vector analysis:

$$V = \frac{1}{6}|e_1 \cdot (e_2 \times e_3)|$$

wherein $e_1$, $e_2$ and $e_3$ denote the vectors connecting the aforementioned "inner point" with each of the 3 corner-points of a surface triangle facet. The total volume of the colour gamut is then obtained by summing up the volume of all individual tetrahedrae.

By using this model of an ideal printing process and the triangulation technique of the gamut surface, the potential colour gamut of a colorant set can be calculated and quantitatively compared with other sets of colorants. Due to the idealized nature of the printing process the potential colour gamut of a set of colorants is obtained regardless of interactions of the colorants with the receiving imaging material and/or performance of the printer and its control software. This circumvents the known shortcomings in experimental gamut determination due to limitations and/of availability of paper, printer and the printing process. The method can be regarded as an absolute, objective benchmark for the determination of the potential gamut volume of a given set of colorants.

EXAMPLES

Materials

All materials used in the following examples were readily available from standard sources such as Aldrich Chemical Co. (Belgium) and Acros (Belgium) unless otherwise specified.

S32000 is an abbreviation for SOLSPERSE™ 32000, a polyethyleneimine-polyester hyperdispersant from NOVEON.

S35000 is an abbreviation for SOLSPERSE™ 35000, a polyethyleneimine-polyester hyperdispersant from NOVEON.

S39000 is an abbreviation for SOLSPERSE™ 39000, a polyethyleneimine-polyester hyperdispersant from NOVEON.

SOLSPERSE™ 5000 is a sulfonated copper phthalocyanine dispersion synergist from NOVEON.

PY150 (A) is an abbreviation used for CHROMOPHTAL™ Yellow LA2, a C.I. Pigment Yellow 150 from CIBA SPECIALTY CHEMICALS.

PY150 (B) is an abbreviation used for CHROMOPHTAL™ Yellow LA, a C.I. Pigment Yellow 150 from CIBA SPECIALTY CHEMICALS.

PM-1 is an abbreviation used for CINQUASIA™ Magenta RT 355D, a quinacridone pigment from CIBA SPECIALTY CHEMICALS.

PM-2 is an abbreviation used for CHROMOPHTAL™ Magenta 2BC, a quinacridone pigment from CIBA SPECIALTY CHEMICALS.

PM-3 is an abbreviation used for CINQUASIA™ Magenta RT 143D, a quinacridone pigment from CIBA SPECIALTY CHEMICALS.

PM-4 is an abbreviation used for CINQUASIA™ Magenta RT 343D, a quinacridone pigment from CIBA SPECIALTY CHEMICALS.

PV19 is an abbreviation used for HOSTAPERM™ Red E5B 02, a C.I. Pigment violet 19 from CLARIANT.

PB15:4 is an abbreviation used for HOSTAPERM™ Blue P-BFS, a C.I. Pigment Blue 15:4 pigment from CLARIANT.

PB15:3 is an abbreviation used for SUNFAST™ Blue 249-1284, a C.I. Pigment Blue 15:3 pigment from SUN CHEMICAL.

PB15:3 (2) is an abbreviation used for Hostaperm Blue B4G, a C.I. Pigment Blue 15:3 pigment from CLARIANT.

PY180 is TONER YELLOW™ HG, a C.I. Pigment Yellow 180 from CLARIANT.

PY213 is HOSTAPERM™ Yellow H5G, a C.I. Pigment Yellow 213 from CLARIANT.

PY120 is NOVOPERM™ Yellow H2G SF, a C.I. Pigment Yellow 120 from CLARIANT.

PY139 is GRAPHTOL™ Yellow H2R VP2284, a C.I. Pigment Yellow 139 from CLARIANT.

PBL7 is Carbon Black MA8™, a carbon black available from MITSUBISHI CHEMICAL.

PBL7 (B) is SPECIAL BLACK™ 550, a carbon black available from DEGUSSA.

Diethyl-5-(hydroxymethyl)isophtalate from ALDRICH.

PR202 is the abbreviation for C.I. Pigment Red 202 for which CINQUASIA MAG RT235D from CIBA SPECIALTY CHEMICALS was used.

DPGDA is dipropyleneglycoldiacrylate available under the trade name of SARTOMER™ SR508 from SARTOMER.

SR9003 is an abbreviation for SARTOMER™ SR9003, a propoxylated neopentyl glycol diacrylate monomer available from SARTOMER CRAYNOR™ CN 386 is an amine modified acrylate synergist available from CRAY VALLEY.

EPD is ethyl 4-dimethylaminobenzoate, available under the trade name of GENOCURE™ EPD from RAHN AG.

ITX is 4-phenylbenzophenone, a photo-initiator available under the trade name of GENOCURE™ ITX from CIBA SPECIALTY CHEMICALS.

TPO is 2,4,6-trimethylbenzoyl-diphenyl-phosphineoxide available under the trade name DAROCUR™ TPO from CIBA SPECIALTY CHEMICALS.

BYK™ 333 is a surfactant available from BYK CHEMIE GMBH.

BYK™ UV3510 is a polyethermodified polydimethylsiloxane wetting agent available from BYK CHEMIE GMBH.

IRGACURE™ 907 is a photo-initiator available from CIBA SPECIALTY CHEMICALS.

ITX is a photo-initiator available under the trade name of DAROCUR™ ITX from CIBA SPECIALTY CHEMICALS.

GENORAD™ 16 is polymerization inhibitor from RAHN AG.

GENOCURE™ PBZ is 4-phenylbenzophenone, a photo-initiator from RAHN AG.

SARTOMER™ 399 LV is a low viscosity dipentaerythritol pentaacrylate from SARTOMER.

The quinacridone derivative QAD-3 is represented by the formula:

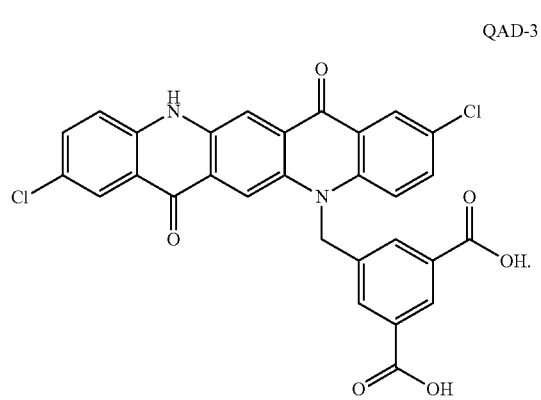

QAD-3

Synthesis of the dispersion synergist QAD-3 was accomplished according to the following synthesis scheme:

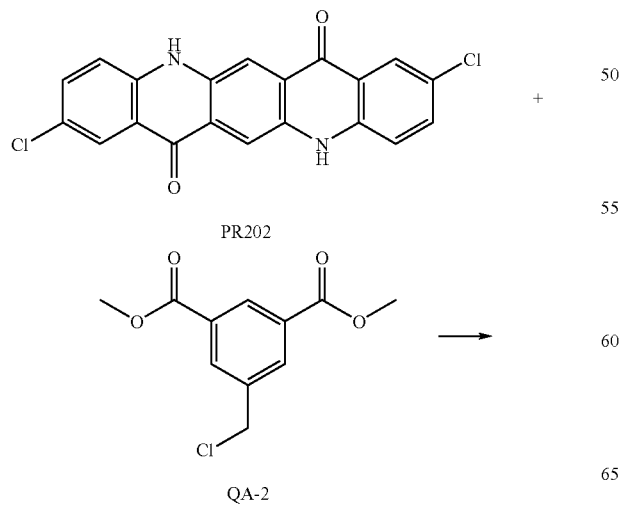

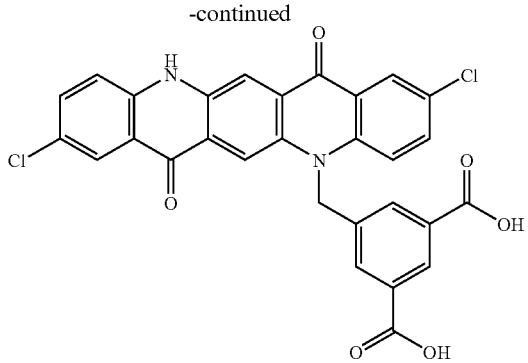

QAD-3

38.1 g (0.1 mol) of dried pigment PR202 in 130 gram dimethylsulfoxide was dissolved by the addition of 23 g (0.205 mol) potassium tert-butoxide. The blue-green solution was heated to about 110° C. for 1 hour. Then the mixture was cooled till 40° C., and 25.5 g (0.105 mol) of compound QA-2 was added. The alkylation-step was done after 4 hours. The product was hydrolyzed by the addition of 400 ml of water and 19.5 gram Potassium hydroxide 86% (0.3 mol) after 4 hours heating at 60° C. Then 75 ml concentrated hydrochloric acid (0.9 mol) was added to the mixture. The dispersion synergist QAD-3 was filtered and washed with water. The yield was 100%.

Synthesis of dimethyl-(5-chloromethyl)isophthalate (QA-2) was accomplished according to the following synthesis scheme:

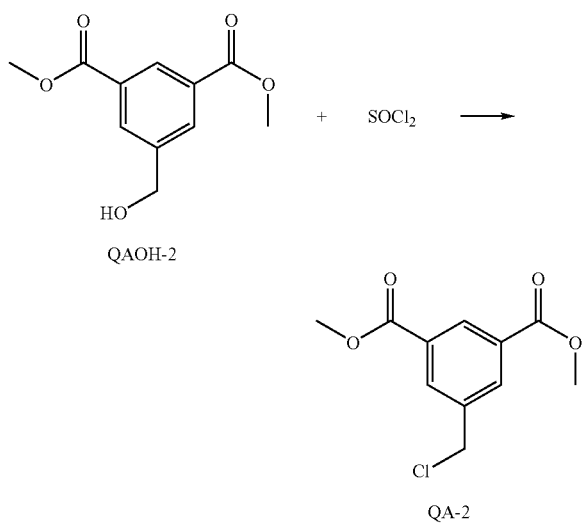

22.4 g (0.1 mol) of dimethyl-(5-hydroxymethyl)isophthalate (QAOH-2) was dissolved in a mixture of 100 mL of Toluene and 0.2 g dimethylacetamide (catalyst). 15.4 g (0.13 mol) of thionylchloride was added drop wise and the mixture was stirred during 4 hour at 40° C. After this period, the mixture was cooled in an ice bath and 50 mL of methanol was added. This solid product QA-2 was filtered and washed with a small volume of methanol. The yield was 58%.

Synthesis of dimethyl-(5-hydroxymethyl)isophthalate QOAH-2 was accomplished according to the following synthesis scheme:

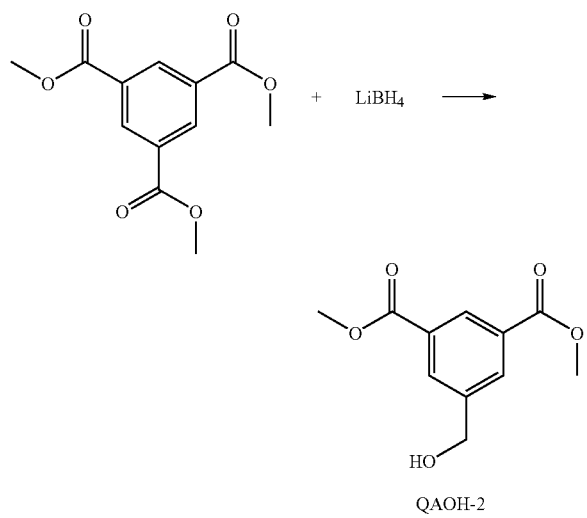

QAOH-2

25.2 g (0.1 mol) of trimethyl 1,3,5 benzenetricarboxylate was dissolved in 85 mL of methyl acetate at 50° C. 40.5 ml (0.08 mol) lithiumborohydride 2.0 M in THF was added drop wise and the mixture was stirred during 3 hour at 50° C. After this period 5.3 gram acetic acid (0.088 mol) and 3 mL water were added. The methyl acetate and THF were evaporated, 50 ml water and 50 ml n-hexane were added. The product QAOH-2 was filtered and washed with a small volume water and n-hexane. The yield was 63%.

Measurement Methods

1. PV19 Content

Instrumentation: Trace DSQ quadrupole mass spectrometer from THERMO ELECTRON Corp. equipped with Direct Sample Probe system, using a DEP (Direct Exposure Probe) heated filament. The source of the mass spectrometer is an EI (electron ionization) source. The probe is heated via a temperature control program to release the components of the solid pigment.

Experimental conditions: A very small amount of the pigment powder was brought onto the DEP probe filament and the following temperature program was performed: 0 mA during 15 seconds-10 mA/s increase rate up to 450 mA-450 mA fixed during 60 seconds-50 mA/s increase rate up to 950 mA-950 mA fixed during 50 seconds (total time is 3 minutes). The MS scan speed was 6 scans/second. Internal normalization of the intensities of the molecular ion of the pigments after background subtraction was used to calculate the ratio of the pigment types in the pigment powder.

2. Colour Gamut

The inkjet inks were diluted with ethyl acetate to have a pigment concentration according to Table 1.

TABLE 1

| Inkjet ink | Pigment concentration |
|---|---|
| Cyan | 0.002% |
| Magenta | 0.005% |
| Yellow | 0.002% |

A spectrophotometric measurement of the UV-VIS-NIR absorption spectrum of the diluted ink was performed in transmission-mode with the double beam-spectrophotometer using the settings of Table 2. Quartz cells with a path length of 10 mm were used and ethyl acetate was chosen as a blank.

TABLE 2

| Mode | Absorbance |
|---|---|
| Wavelength range | 240-900 nm |
| Slit width | 2.0 nm |
| Scan interval | 1.0 nm |
| Scan speed | Fast (1165 nm/min) |
| Detector | photo-multiplier(UV-VIS) |

The UV-VIS-NIR absorption spectrum was used in the calculation method as described above using the Saunderson parameters $r_s$=0.001, $r_i$=0.6 and epl=3.2.

3. Average Particle Size

The average particle size diameter was determined with a Brookhaven Instruments Particle Sizer BI90plus based upon the principle of dynamic light scattering. The ink or dispersion was diluted with ethyl acetate to a pigment concentration of 0.002 wt %. The measurement settings of the BI90plus were: 5 runs at 23° C., angle of 90°, wavelength of 635 nm and graphics=correction function.

4. Viscosity

The viscosity of the inkjet inks was measured using a Brookfield DV-II+ viscometer at 25° C. and shear rate of 15 RPM.

5. Surface Tension

The surface tension of the inkjet inks was measured with a KRÜSS tensiometer K9 at 25° C. after 60 seconds.

6. Absorbance

An ink is diluted in ethyl acetate (ACROS™ pro analysis, 99.5%) to a pigment concentration of 40 ppm (0.004 wt %). The absorption spectrum of this diluted ink is measured using an AGILENT™ 8453 spectrophotometer in the range from 190 to 1100 nm with an interval of 1 nm, using a standard 1 cm quartz cell. Ethyl acetate was used as a blank.

The maximum absorbance $A_{max}$ in the range of 380 to 850 nm is determined using the peak-find routine of the AGILENT™ UV-Chemstation software version A.10.01. The measured absorption spectrum is then normalized by multiplying the absorbance values at each wavelength in the range from 380 to 850 nm by the reciprocal value of $A_{max}$.

The peak area between 2 chosen wavelengths is calculated by summation of the normalized absorbance values in that range. Thus, for example, $ABS(M)_{500-600}$ is the summation of the normalized absorbance values of each wavelength between 500 and 600 nm.

Example 1

This example illustrates how the colour gamut is improved by changing the amount of unsubstituted quinacridone in the magenta pigment for an inkjet ink set comprising C.I. Pigment Yellow 150 and a β-copper phthalocyanine pigment.

Magenta Pigments

From a wide range of commercially available quinacridone pigments and mixed crystals thereof, a selection of mixed crystals of unsubstituted quinacridone (=C.I. Pigment Violet 19) and 2,9-dichloroquinacridone (=C.I. Pigment Red 202) was made to illustrate the invention. The selected magenta pigments were checked with Liquid Chromatography Mass Spectrometry and 1-H NMR to verify that the pigments consisted for a major amount out of unsubstituted quinacridone and 2,9-dichloroquinacridone. For all pigments PM-1 to PM-2, it was found that more than 98% of the pigment consisted of unsubstituted quinacridone and 2,9-dichloroquinacridone. The content of unsubstituted quinacridone and 2,9-dichloroquinacridone itself was determined by Probe-MS. Internal normalization of the intensities of the molecular ion of C.I. Pigment Violet 19 (m/z=312) and C.I. Pigment Red 202 (m/z=380) after background subtraction was used to calculate the percentage of both pigment types in the pigment powder.

The results are shown in Table 3.

TABLE 3

| Magenta pigment | % unsubstituted quinacridone | % 2,9-dichloroquinacridone |
|---|---|---|
| PM-1 | 88 | 12 |
| PM-2 | 83 | 17 |
| PM-3 | 53 | 47 |
| PM-4 | 26 | 74 |

Preparation of Magenta Inkjet Inks M1 to M6

The concentrated pigment dispersions of Table 4 were all prepared in the same manner except that different types and amounts of pigments, polymeric dispersants and other components were used. The preparation of the concentrated pigment dispersion is exemplified for the concentrated pigment dispersion CM-4, which was used to prepare inkjet ink M1.

TABLE 4

| wt % of | CM-1 | CM-2 | CM-3 | CM-4 | CM-5 | CM-6 |
|---|---|---|---|---|---|---|
| PM-1 | 10 | 20 | — | — | — | — |
| PM-2 | — | — | 10 | — | — | — |
| PM-3 | — | — | — | 10 | — | — |
| PM-4 | — | — | — | — | 10 | — |
| PV19 | — | — | — | — | — | 20 |
| S35000 | — | 20 | 10 | — | — | 20 |
| S39000 | 10 | — | — | 10 | 10 | — |
| QAD-1 | — | — | 1 | — | — | — |
| GENORAD 16 | — | — | 1 | — | — | — |
| DPGDA | 80 | 60 | 78 | 80 | 80 | 60 |
| Used in ink: | M4 | M6 | M5 | M1 | M2 | M3 |

The concentrated pigment dispersion CM-4 was made by mixing the 100.0 g of the pigment PM-3 and 333.3 g of a 30% solution in DPGDA™ of the polymeric dispersant in DPGDA for 30 minutes using a DISPERLUX™ YELLOW075 (from DISPERLUX S.A.R.L., Luxembourg) and subsequently milling this mixture in a Eiger Lab Bead mill (from EIGER TORRANCE Ltd.) using yttrium-stabilized zirconium oxide-beads of 0.4 mm diameter ("high wear resistant zirconia grinding media" from TOSOH Co.). The bead mill is filled for 50% with the grinding beads and water-cooled during milling at 4250 rpm for 180 minutes. After milling the dispersion was separated from the beads using a filter cloth.

The curable magenta inkjet inks M1 to M6 were all prepared in the same manner to obtain a composition as shown in Table 5 using the concentrated pigment dispersions of Table 4.

TABLE 5

| wt % of | M1 | M2 | M3 | M4 | M5 | M6 |
|---|---|---|---|---|---|---|
| PM-3 | 4.00 | — | — | — | — | — |
| PM-4 | — | 4.00 | — | — | — | — |
| PV19 | — | — | 4.00 | — | — | — |
| PM-1 | — | — | — | 4.00 | — | 4.00 |
| PM-2 | — | — | — | — | 4.00 | — |
| S39000 | 4.00 | 4.00 | — | 4.00 | — | — |
| S35000 | — | — | 4.00 | — | 4.00 | 4.00 |
| QAD-1 | — | — | — | — | 0.40 | — |
| DPGDA | 39.47 | 39.47 | 78.77 | 78.77 | 39.07 | 39.47 |
| SR9003 | 40.00 | 40.00 | — | — | 40.00 | 40.00 |
| CN386 | 5.00 | 5.00 | 9.40 | 9.40 | 5.00 | 5.00 |
| ITX | 5.00 | 5.00 | 1.90 | 1.90 | 5.00 | 5.00 |
| TPO | 2.50 | 2.50 | — | — | 2.50 | 2.50 |
| IRGACURE™ 907 | — | — | 1.90 | 1.90 | — | — |
| GENORAD™ 16 | 1.00 | 1.00 | 1.00 | 1.00 | 1.00 | 1.00 |
| BYK™ 333 | 0.03 | 0.03 | 0.03 | 0.03 | 0.03 | 0.03 |

Preparation of Cyan Inkjet Inks C1 to C3

The concentrated pigment dispersions CC-1 to CC-3 containing either PB15:4 or PB15:3 as a β-copper phthalocyanine pigment were all prepared in the same manner as described above for the magenta pigment dispersion CM-4 but now according to Table 6.

TABLE 6

| wt % of | CC-1 | CC-2 | CC-3 |
|---|---|---|---|
| PB15:4 | 20.00 | 20.00 | — |
| PB15:3 | — | — | 14.00 |
| S39000 | — | 20.00 | 14.00 |
| S35000 | 20.00 | — | — |
| S5000 | — | — | 3.50 |
| GENORAD™ 16 | — | — | 1.00 |
| DPGDA | 60.00 | 60.00 | 67.50 |
| Used in ink: | C1 | C2 | C3 |

Using the concentrated pigment dispersions CC-1 to CC-3, three different curable cyan inkjet inks C1 to C3 were prepared according to Table 7.

TABLE 7

| wt % of | C1 | C2 | C3 |
|---|---|---|---|
| PB15:4 | 4.00 | 4.00 | — |
| PB15:3 | — | — | 4.00 |
| S39000 | — | 4.00 | 4.00 |
| S35000 | 4.00 | — | — |
| S5000 | — | — | 0.29 |
| DPGDA | 38.47 | 77.77 | 77.48 |
| SR9003 | 40.00 | — | — |
| CN386 | 5.00 | 9.40 | 9.40 |
| ITX | 5.00 | 1.90 | 1.90 |
| TPO | 2.50 | — | — |
| IRGACURE™ 907 | — | 1.90 | 1.90 |
| BYK™ 333 | 0.03 | 0.03 | 0.03 |
| GENORAD™ 16 | 1.00 | 1.00 | 1.00 |

Preparation of Yellow Inkjet Inks Y1 to Y3

The concentrated pigment dispersions CY-1 to CY-3 were all prepared in the same manner as described above for the magenta pigment dispersion CM-4 but now according to Table 8.

TABLE 8

| wt % of | CY-1 | CY-2 | CY-3 |
|---|---|---|---|
| PY150 (A) | 20.00 | — | — |
| PY150 (B) | — | 20.00 | 20.00 |
| S39000 | — | 20.00 | — |
| S35000 | 20.00 | — | 20.00 |
| GENORAD™ 16 | 1.00 | 1.00 | 1.00 |
| DPGDA | 59.00 | 59.00 | 59.00 |
| Used in ink: | Y1 | Y2 | Y3 |

Using the concentrated pigment dispersions CC-1 to CC-3, three different curable yellow inkjet inks Y1 to Y3 were prepared according to according to Table 9.

TABLE 9

| wt % of | Y1 | Y2 | Y3 |
| --- | --- | --- | --- |
| PY150 (A) | 4.00 | — | — |
| PY150 (B) | — | 4.00 | 4.00 |
| S39000 | — | 4.00 | — |
| S35000 | 4.00 | — | 4.00 |
| DPGDA | 38.47 | 38.47 | 22.23 |
| SR9003 | 40.00 | 40.00 | — |
| CN386 | 5.00 | 5.00 | 9.40 |
| ITX | 5.00 | 5.00 | 1.90 |
| TPO | 2.50 | 2.50 | — |
| IRGACURE ™ 907 | — | — | 1.90 |
| BYK ™ 333 | 0.03 | 0.03 | 0.03 |
| GENORAD ™ 16 | 1.00 | 1.00 | 1.00 |

Curable Pigment Inkjet Ink Sets and Evaluation

The colour gamut was determined for the comparative curable pigment inkjet ink sets COMP-1 to COMP-4 and the inventive curable pigment inkjet ink sets INV-1 to INV-6 comprising the curable cyan inkjet inks C1 to C3, the curable magenta inkjet inks M1 to M6 and the curable yellow inkjet inks Y1 to Y3 according to Table 10.

TABLE 10

| Curable Ink set | Cyan ink | Magenta ink No. | Magenta ink PV19 Content | Yellow ink | Colour gamut |
| --- | --- | --- | --- | --- | --- |
| COMP-1 | C1 | M1 | 53% | Y1 | 681630 |
| COMP-2 | C1 | M2 | 27% | Y1 | 633235 |
| COMP-3 | C1 | M1 | 53% | Y2 | 653318 |
| COMP-4 | C2 | M3 | 100% | Y3 | 615364 |
| INV-1 | C3 | M4 | 88% | Y3 | 719030 |
| INV-2 | C2 | M4 | 88% | Y3 | 716841 |
| INV-3 | C1 | M5 | 83% | Y1 | 786876 |
| INV-4 | C1 | M6 | 88% | Y1 | 751919 |
| INV-5 | C1 | M5 | 83% | Y2 | 750130 |
| INV-6 | C1 | M6 | 88% | Y2 | 716841 |

From Table 10, it is clear that all the inventive curable pigment inkjet ink sets INV-1 to INV-6 were capable of producing more than 700,000 different colours. On the other hand none of the comparative curable pigment inkjet ink sets COMP-1 to COMP-3 having a magenta inkjet ink containing a mixed crystal comprising 53 wt % or less of unsubstituted quinacridone nor the comparative curable pigment inkjet ink set COMP-4 having a magenta inkjet ink containing an unsubstituted quinacridone pigment were capable of producing more than 700,000 different colours.

Example 2

This example illustrates the excellent colour gamut which can be obtained using a curable yellow inkjet ink comprising C.I. Pigment Yellow 150 compared to some other yellow pigments in combination in a curable inkjet ink set having a curable cyan inkjet containing a β-copper phthalocyanine pigment and a curable magenta inkjet ink comprising a mixed crystal of containing C.I. Pigment Violet 19 and C.I. Pigment Red 202 wherein C.I. Pigment Violet 19 is present in the mixed crystal in an amount of between 88% as measured by Probe-MS.

Preparation of Magenta Inkjet Ink M7

The concentrated pigment dispersion CM-7 was prepared in the same manner as described above for the magenta pigment dispersion CM-4 but now according to Table 11.

TABLE 11

| wt % of | CM-7 |
| --- | --- |
| PM-1 | 20.00 |
| S35000 | 20.00 |
| GENORAD ™ 16 | 1.00 |
| DPGDA | 59.00 |

A curable magenta inkjet ink M7 was obtained by mixing the concentrated pigment dispersion CM-7 with the other components according to Table 12.

TABLE 12

| wt % of | M7 |
| --- | --- |
| PM-1 | 4.00 |
| S35000 | 4.00 |
| DPGDA | 80.90 |
| EPD | 5.00 |
| TPO | 5.00 |
| BYK ™ UV3510 | 0.10 |
| GENORAD ™ 16 | 1.00 |

Preparation of Cyan Inkjet Ink C4

The concentrated pigment dispersion CC-4 was prepared in the same manner as described above for the magenta pigment dispersion CM-4 but now according to Table 13.

TABLE 13

| wt % of | CC-4 |
| --- | --- |
| PB15:4 | 20.00 |
| S35000 | 20.00 |
| GENORAD ™ 16 | 1.00 |
| DPGDA | 59.00 |

A curable cyan inkjet ink C4 was obtained by mixing the concentrated pigment dispersion CC-4 with the other components according to Table 14.

TABLE 14

| wt % of | C4 |
| --- | --- |
| PB15:4 | 4.00 |
| S35000 | 4.00 |
| DPGDA | 80.90 |
| EPD | 5.00 |
| TPO | 5.00 |
| BYK ™ UV3510 | 0.10 |
| GENORAD ™ 16 | 1.00 |

Preparation of Yellow Inkjet in Y4 to Y6

The concentrated pigment dispersions CY-4 to CY-7 were all prepared in the same manner as described above for the magenta pigment dispersion CM-4 but now according to Table 15.

TABLE 15

| wt % of | CY-4 | CY-5 | CY-6 | CY-7 |
| --- | --- | --- | --- | --- |
| PY150 (A) | 20.00 | — | — | — |
| PY180 | — | 10.00 | — | — |
| PY213 | — | — | 10.00 | — |
| PY120 | — | — | — | 10.00 |
| S35000 | 20.00 | 10.00 | 10.00 | 10.00 |

TABLE 15-continued

| wt % of | CY-4 | CY-5 | CY-6 | CY-7 |
|---|---|---|---|---|
| GENORAD ™ 16 | 1.00 | — | — | 1.00 |
| DPGDA | 59.00 | 80.00 | 80.00 | 80.00 |

Using the concentrated pigment dispersions CY-4 to CY-7, four different curable yellow inkjet inks Y4 to Y7 were prepared according to Table 16.

TABLE 16

| wt % of | Y4 | Y5 | Y6 | Y7 |
|---|---|---|---|---|
| PY150 | 4.00 | — | — | — |
| PY180 | — | 4.00 | — | — |
| PY213 | — | — | 4.00 | — |
| PY120 | — | — | — | 4.00 |
| S35000 | 4.00 | 4.00 | 4.00 | 4.00 |
| DPGDA | 80.90 | 80.90 | 80.90 | 80.90 |
| EPD | 5.00 | 5.00 | 5.00 | 5.00 |
| TPO | 5.00 | 5.00 | 5.00 | 5.00 |
| BYK ™ UV3510 | 0.10 | 0.10 | 0.10 | 0.10 |
| GENORAD ™ 16 | 1.00 | 1.00 | 1.00 | 1.00 |

Curable Pigment Inkjet Ink Sets and Evaluation

The colour gamut was determined for the comparative curable pigment inkjet ink sets COMP-5 to COMP-7 and the inventive curable pigment inkjet ink sets INV-7 comprising the curable cyan inkjet ink C4, the curable magenta inkjet ink M7 and the curable yellow inkjet inks Y4 to Y7 according to Table 17.

TABLE 17

| Curable Ink set | Cyan ink | Magenta ink | Yellow ink | | Colour gamut (×1000 colours) |
|---|---|---|---|---|---|
| INV-7 | C4 | M7 | Y4 | PY150 | 752 |
| INV-8 | C4 | M7 | Y5 | PY180 | 709 |
| COMP-5 | C4 | M7 | Y6 | PY213 | 588 |
| COMP-6 | C4 | M7 | Y7 | PY120 | 578 |

From Table 17, it is clear that only the inventive curable pigment inkjet ink sets INV-7 and INV-8 was capable of producing more than 700,000 different colours.

For each yellow inkjet ink, the absorbance $ABS(Y)_{500-530}$ between 500 and 530 nm and the absorbance $ABS(Y)_{400-500}$ between 400 and 500 nm both in a normalized absorption spectrum of the yellow ink were determined. The results are shown in Table 18.

TABLE 18

| Yellow Inkjet ink | Yellow Pigment | $ABS(Y)_{500-530}$ | $ABS(Y)_{400-500}$ |
|---|---|---|---|
| Y4 | PY150 | 2 | 66 |
| Y5 | PY180 | 2 | 64 |
| Y5 | PY213 | 3 | 52 |
| Y6 | PY120 | 5 | 64 |

From Table 18, it is clear that the prepare a curable inkjet ink set in accordance with the present invention that the absorbance $ABS(Y)_{500-530}$ between 500 and 530 nm should be smaller than 5 and the absorbance $ABS(Y)_{400-500}$ should be larger than 60.

The absorbance $ABS(M)_{500-530}$ between 500 and 530 nm in a normalized absorption spectrum of the magenta ink M7 was found to be 22, while the absorbance $ABS(M)_{500-600}$ in the range between 500 and 600 nm in a normalized absorption spectrum of the magenta ink M7 was 67. The absorbance's determined for the comparative magenta inkjet inks M1 to M3 and the inventive inkjet ink M5 are shown by Table 19.

TABLE 19

| Magenta ink | | | |
|---|---|---|---|
| No. | PV19 Content | $ABS(M)_{500-530}$ | $ABS(M)_{500-600}$ |
| M1 | 53% | 13 | 57 |
| M2 | 27% | 12 | 55 |
| M3 | 100% | 19 | 59 |
| M5 | 83% | 22 | 63 |

From the result found for the magenta ink M7 and Table 19, it is clear that in order to prepare a curable inkjet ink set in accordance with the present invention that the absorbance $ABS(M)_{500-530}$ should be larger than 20 and the absorbance $ABS(M)_{500-600}$ should be larger than 60.

A small value for $ABS(Y)_{500-530}$ means that the yellow ink does not overlap too much in absorbance with the magenta ink and a large value for $ABS(M)_{500-530}$ means that there is no large gap in the absorbance of the magenta ink and the yellow ink, provided that the yellow and magenta inks are substantially absorbing in there own absorbance region of 400 to 500 nm, respectively 500 to 600 nm.

Example 3

In this example two curable CMYK inkjet ink sets A and B were optimized for dispersion stability and reliability were prepared and then printed on an Agfa:DOTRIX™ single pass inkjet printer.

Curable Inkjet Ink Set A

The curable CMYK inkjet ink set A was prepared according to Table 20. The black ink was prepared using a concentrated dispersion wherein the pigments were co-milled.

TABLE 20

| in wt % of ink | Black ink K | Magenta ink M | Cyan ink C | Yellow ink Y |
|---|---|---|---|---|
| DPGDA | 43.71 | 43.97 | 46.34 | 47.47 |
| S9003 | 40.00 | 40.00 | 40.00 | 40.00 |
| PBL7 | 2.25 | X | X | X |
| PV19 | 0.81 | 5.00 | X | X |
| PB15:3 (2) | 0.81 | X | X | X |
| PB15:3 | X | X | 2.50 | X |
| PY139 | X | X | X | 2.00 |
| S39000 | 3.88 | 2.50 | 2.50 | 2.00 |
| S5000 | X | X | 0.13 | X |
| ITX | 5.00 | 5.00 | 5.00 | 5.00 |
| CRAYNOR ™ CN 386 | 2.50 | 2.50 | 2.50 | 2.50 |
| BYK ™ 333 | 0.03 | 0.03 | 0.03 | 0.03 |
| GENORAD ™ 16 | 1.00 | 1.00 | 1.00 | 1.00 |

Curable Inkjet Ink Set B

The curable CMYK inkjet ink set B was prepared according to Table 21. The black ink was prepared using a concentrated dispersion wherein the pigments were co-milled.

TABLE 21

| in wt % of ink | K | M | C | Y |
|---|---|---|---|---|
| DPGDA | 76.25 | 79.94 | 77.00 | 77.60 |
| PBL7 (B) | 2.25 | X | X | X |

TABLE 21-continued

| in wt % of ink | K | M | C | Y |
|---|---|---|---|---|
| PM-2 | 0.81 | 4.00 | X | X |
| PB15:4 | 0.81 | X | 3.00 | X |
| PY150 (A) | X | X | X | 2.70 |
| S35000 | 3.87 | 4.00 | 3.00 | 2.70 |
| QAD-1 | 0.01 | 0.06 | X | X |
| EPD | 5.00 | 5.00 | 5.00 | 5.00 |
| GENOCURE ™ PBZ | 4.50 | 2.50 | 2.50 | 2.50 |
| TPO | 4.50 | 2.50 | 2.50 | 2.50 |
| SARTOMER ™ 399 LV | x | x | 5.00 | 5.00 |
| BYK ™ UV 3510 | 1.00 | 1.00 | 1.00 | 1.00 |
| GENORAD ™ 16 | 1.00 | 1.00 | 1.00 | 1.00 |

The physical properties of the inkjet inks in curable inkjet ink set B are listed in Table 22.

TABLE 22

| Physical properties | K | M | C | Y | Dimension |
|---|---|---|---|---|---|
| viscosity at 25° C. | 25 | 24 | 22 | 22 | mPa · s |
| viscosity at 45° C. | 12.2 | 12.1 | 10.5 | 11.2 | mPa · s |
| surface tension at 25° C. | 23.2 | 23.2 | 23.0 | 23.4 | mN/m |
| average particle size | 111 | 136 | 113 | 147 | nm |

Each of the inks of the CMYK ink set s A and B was degassed prior to jetting with the Agfa:DOTRIX™ single pass inkjet printer equipped with Toshiba TEC CB1 print heads. These piezoelectric drop-on-demand print heads are capable of jetting multi-drops within one dot (8 levels) with a minimum of 6 picoliter to maximum 42 picoliter per dot. The standard frequency used was 4.8 KHz/dot (7 drops) and the driving voltage was 22 Volt (ejection orifice diameter=26 micron). The order of printing of the different inks at 300 dpi was first cyan, then magenta, yellow and black.

In this example, the colour gamut was adapted to start from printed full density patches of cyan, magenta, yellow, black, green, red and blue, together with the unprinted paper whiteness were measured with a GRETAG™ SPM50 spectrophotometer in CieL*a*b* colour space. From these values a calculation of the potential volume of the colour gamut was performed.

The gamut calculation method started from the CIE L*a*b* coordinates (illuminant D50, 2 degree CIE observer) on CMYKBGR of 100% printed patches and those of the unprinted paper (W). Those 8 coordinates represent the corner points of the gamut in colour space, which is known to have the shape of a deformed cube and which has a diagonal WK roughly along the L* axis. In the basic calorimetric comparison methods for gamut calculation applied here, the corner points of that cube are thought to be connected by straight lines in L*a*b* space. The volume of that deformed cube can then be calculated by inscription of 12 tetrahedrons, which are formed by the corner points of that deformed cube and an additional inner auxiliary point N, which can be arbitrarily defined by the average coordinates of L* of W and K and a*=b*=0. This way, 6 tetrahedrons are formed by four points each, namely N, K and two adjacent points CB, BM, MR, RY, YG and GC in the upper half of the deformed cube. Likewise, 6 tetrahedrons are formed by replacing K with W in the lower half. The calculation of the volume of tetrahedrons is known from basic vector algebra: The volume is equal to ⅙ of the vector-product defined by the three vectors (i.e. differences in L*a*b* coordinates) of each tetrahedron that start e.g. from the point N and point to the remaining 3 points of that tetrahedron. The summation of the volumes of the 12 individual tetrahedrons results in the gamut volume, which is expressed in units cubes with the dimensions Delta L*=Delta a*=Delta b*=1.

The result of the colour gamut calculation is shown in Table 23.

TABLE 23

| Curable inkjet ink set | calculated colour gamut volume |
|---|---|
| A | 408294 |
| B | 447401 |

The absorbance's in a normalized absorption spectrum of the yellow and magenta inkjet inks were determined of both curable inkjet ink sets and are shown in Table 24 respectively Table 25.

TABLE 24

| Yellow Inkjet ink of | Yellow Pigment | $ABS(Y)_{500-530}$ | $ABS(Y)_{400-500}$ |
|---|---|---|---|
| Ink set A | PY139 | 7 | 83 |
| Ink set B | PY150 | 2 | 66 |

TABLE 25

| Magenta inkjet ink of | Pigment Type | PV19 Content | $ABS(M)_{500-530}$ | $ABS(M)_{500-600}$ |
|---|---|---|---|---|
| Ink set A | PV19 | 100% | 19 | 59 |
| Ink set B | PM-2 | 83% | 22 | 63 |

From Table 24, it can be seen that the curable inkjet ink set A even with a yellow inkjet ink having a much higher absorbance between 400 and 500 nm but also a larger overlap with the magenta ink in combination with a magenta inkjet ink absorbing only a bit less between 500 and 600 nm, and especially between 500 and 530 nm, than the magenta ink of the curable inkjet ink set B. This results in a colour gamut for the curable inkjet ink set A inferior to the curable inkjet ink set B.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:

1. A curable pigment inkjet ink set comprising:
a cyan inkjet ink;
a yellow inkjet ink; and
a magenta inkjet ink; wherein
the yellow inkjet ink having $ABS(Y)_{500-530}<5$ and $ABS(Y)_{400-500}>60$ includes one or more yellow pigments;
the cyan inkjet ink includes one or more β-copper phthalocyanine pigments;
the magenta inkjet ink contains a mixed crystal such that a first quinacridone and a second quinacridone enter into a same crystal lattice in a ratio of the first quinacridone over the second quinacridone and such that $ABS(M)_{500-530}>20$ and $ABS(M)_{500-600}>60$;
$ABS(Y)_{500-530}$ represents an absorbance of the yellow inkjet ink between 500 and 530 nm in a normalized absorption spectrum of the yellow ink;

ABS(M)$_{500\text{-}530}$ represents an absorbance of the magenta inkjet ink between 500 and 530 nm in a normalized absorption spectrum of the magenta ink;

ABS(Y)$_{400\text{-}500}$ represents an absorbance of the yellow inkjet ink between 400 and 500 nm in a normalized absorption spectrum of the yellow ink;

ABS(M)$_{500\text{-}600}$ represents an absorbance of the magenta inkjet ink between 500 and 600 nm in a normalized absorption spectrum of the magenta ink;

ABS(X)$_{wL1\text{-}WL2}$ represents a peak area between wavelengths WL1 and WL2 calculated by summation of the normalized absorbance values in the range WL1 to WL2 which are obtained by multiplying the absorbance values at each wavelength in the range from 380 nm to 850 nm by the reciprocal value of the maximum absorbance $A_{max}$ in the range of 380 nm to 850 nm using a spectrophotometer with an interval of 1 nm on the ink X diluted in ethyl acetate to a pigment concentration of 40 ppm;

the cyan, yellow, and magenta inkjet inks of the curable pigment inkjet ink set are curable by exposure to actinic radiation and/or electron beam curing; and each of the cyan, yellow, and magenta inkjet inks includes at least a pigment, a dispersant, and a polymerizable compound.

2. The curable pigment inkjet ink set according to claim 1, wherein the first quinacridone is C.I. Pigment Violet 19.

3. The curable pigment inkjet ink set according to claim 2, wherein the second quinacridone is C.I. Pigment Red 202.

4. The curable pigment inkjet ink set according to claim 3, wherein the yellow inkjet ink comprises C.I. Pigment Yellow 150.

5. The curable pigment inkjet ink set according to claim 2, wherein the mixed crystal includes C.I. Pigment Violet 19 in an amount between 75% and 95% as measured by Probe-MS.

6. The curable pigment inkjet ink set according to claim 5, wherein the mixed crystal includes C.I. Pigment Violet 19 in an amount between 80% and 90% as measured by Probe-MS.

7. The curable pigment inkjet ink set according claim 4, further comprising C.I. Pigment Blue 15:4.

8. The curable pigment inkjet ink set according to claim 7, wherein the magenta inkjet ink includes a dispersion synergist.

9. The curable pigment inkjet ink set according to claim 8, further comprising a black inkjet ink.

10. The curable pigment inkjet ink set according to claim 9, wherein the black inkjet ink includes a carbon black pigment and at least one non-black pigment having an absorbance maximum between 500 nm and 800 nm.

11. The curable pigment inkjet ink set according to claim 10, wherein the at least one non-black pigment is a copper phthalocyanine pigment.

12. A method for preparing a curable pigment inkjet ink set as defined by claim 1, comprising the step of:
preparing the magenta inkjet ink by milling the mixed crystal such that the first quinacridone and the second quinacridone enter into the same crystal lattice; wherein the first quinacridone is C.I. Pigment Violet 19.

\* \* \* \* \*